US012431268B2

(12) United States Patent
Fu et al.

(10) Patent No.: US 12,431,268 B2
(45) Date of Patent: Sep. 30, 2025

(54) R-T-B PERMANENT MAGNET MATERIAL AND PREPARATION METHOD THEREFOR AND USE THEREOF

(71) Applicant: FUJIAN GOLDEN DRAGON RARE-EARTH Co., Ltd., Fujian (CN)

(72) Inventors: Gang Fu, Fujian (CN); Jiaying Huang, Fujian (CN); Jixiang Huang, Fujian (CN); Qichen Quan, Fujian (CN)

(73) Assignee: FUJIAN GOLDEN DRAGON RARE-EARTH Co., Ltd., Fujian (CN)

( * ) Notice: Subject to any disclaimer, the term of this patent is extended or adjusted under 35 U.S.C. 154(b) by 603 days.

(21) Appl. No.: 17/637,522

(22) PCT Filed: Jul. 7, 2020

(86) PCT No.: PCT/CN2020/100590
§ 371 (c)(1),
(2) Date: Feb. 23, 2022

(87) PCT Pub. No.: WO2021/098226
PCT Pub. Date: May 27, 2021

(65) Prior Publication Data

US 2022/0293311 A1 Sep. 15, 2022

(30) Foreign Application Priority Data

Nov. 21, 2019 (CN) ........................ 201911150985.5

(51) Int. Cl.
*H01F 1/057* (2006.01)
*C22C 38/00* (2006.01)
(Continued)

(52) U.S. Cl.
CPC ......... *H01F 1/0577* (2013.01); *C22C 38/002* (2013.01); *C22C 38/005* (2013.01);
(Continued)

(58) Field of Classification Search
None
See application file for complete search history.

(56) References Cited

FOREIGN PATENT DOCUMENTS

CN 102903471 A 1/2013
CN 103366918 A * 10/2013
(Continued)

OTHER PUBLICATIONS

Sep. 30, 2020 International Search Report issued in International Patent Application No. PCT/CN2020/100590.
(Continued)

*Primary Examiner* — Anthony M Liang
(74) *Attorney, Agent, or Firm* — Houston Beshining Law Office PLLC; Liangang Ye

(57) ABSTRACT

An R-T-B permanent magnet material and a preparation method therefor and a use thereof. The R-T-B permanent magnet material comprises the following components: R', which is between 29.5 wt. % and 33.0 wt. %, the R comprising R, Pr, and Nd, R being a rare earth element other than Pr and Nd, the Pr content being greater than or equal to 8.85 wt. %, the mass ratio of Nd to R' being less than 0.5; N, which is greater than 0.05 wt. %, and less than or equal to 4.1 wt. %, the N being Ti, Zr, or Nb; B, which is between 0.90 wt. % and 1.2 wt. %; and Fe, which is between 62.0 wt. % and 68.0 wt. %. A sintered permanent magnet product having a high coercive force and a stable temperature coefficient is prepared by using a formulation having a high Pr content. The described formulation can maximally exert the advantage of Pr, and effectively reduce production costs.

20 Claims, 1 Drawing Sheet

(51) Int. Cl.

| | |
|---|---|
| ***C22C 38/06*** | (2006.01) |
| ***C22C 38/10*** | (2006.01) |
| ***C22C 38/14*** | (2006.01) |
| ***C22C 38/16*** | (2006.01) |
| ***C22C 38/32*** | (2006.01) |

(52) U.S. Cl.

CPC .............. *C22C 38/06* (2013.01); *C22C 38/10* (2013.01); *C22C 38/14* (2013.01); *C22C 38/16* (2013.01); *C22C 38/32* (2013.01); *C22C 2202/02* (2013.01)

(56) References Cited

FOREIGN PATENT DOCUMENTS

| | | | |
|---|---|---|---|
| CN | 103871705 | A | 6/2014 |
| CN | 104979062 | A | 10/2015 |
| IN | 110853855 | A | 2/2020 |
| JP | H06124825 | A | 5/1994 |

OTHER PUBLICATIONS

Sep. 23, 2020 Written Opinion of the International Searching Authority issued in International Patent Application No. PCT/CN2020/100590.

* cited by examiner

R-T-B PERMANENT MAGNET MATERIAL AND PREPARATION METHOD THEREFOR AND USE THEREOF

The present application is a National Stage of International Application No. PCT/CN2020/100590, filed on Jul. 7, 2020, which claims priority of the Chinese Patent Application No. CN 201911150985.5 filed on Nov. 21, 2019, the contents of which are incorporated herein by reference in their entireties.

TECHNICAL FIELD

The present disclosure relates to an R-T-B permanent magnet material, a preparation method therefor, and use thereof.

BACKGROUND

Since the discovery of $Nd_2Fe_{14}B$ by Soviet scientists in 1979, the researchers in the United States and Japan have been the first to study the properties of this phase, the phase composed of PrNd (with the mass ratio of Pr to Nd of 20:80 or 25:75) has been used in commercial production of sintered permanent magnet, due to its advantages of high magnetic energy product and high remanence, at present it has been widely used in motor, electroacoustic device, computer hard disk drive (HDD), military equipment, human nuclear magnetic resonance imaging (MRI), microwave communication technology, controller, instrument and so on.

With the progress of science and technology, the performance of Nd—Fe—B has been put forward higher requirements, many researchers have improved the performance of neodymium-iron-boron magnet material by adding a large amount of heavy rare earth Dy or Tb, however, excessive use of heavy rare earths will dramatically increase the cost of materials, and at the same time, the resources of heavy rare earths are relatively few.

Therefore, the technical problem to be solved urgently in this field is how to make use of the elements with abundant resources to obtain the neodymium-iron-boron material with high coercivity, high remanence and stable temperature coefficient.

CONTENT OF THE PRESENT INVENTION

The technical problem to be solved in the present disclosure is for overcoming the defects that the performance improvement of sintered neodymium-iron-boron magnet is excessively dependent on heavy rare earth elements in the prior art, instead, the present disclosure provides an R-T-B permanent magnet material, a preparation method therefor and a use thereof. The sintered permanent magnet product with high coercivity and stable temperature coefficient is prepared by improving the content of Pr. The PrNd used in the disclosure is associated rare earth with abundant reserves, the formulation of the disclosure can maximize the advantage of Pr and reduce the production cost effectively.

In the course of research and development, the inventors found that the phase formed by Pr easily leads to the deterioration of the temperature coefficient of the R-T-B permanent magnet material, after creative efforts, the inventors found that adding metals such as Ti, Zr or Nb while increasing the content of Pr can effectively solve the problem of the deterioration of the temperature coefficient caused by high content of Pr.

The present disclosure provides an R-T-B permanent magnet material, which comprises the following components by mass percentage:

R': 29.5-33.0 wt. %, R' comprising R and Pr, Nd; wherein:
R is a rare earth element other than Pr and Nd, the content of Pr is ≥8.85 wt. %, the mass ratio of Nd to R' is <0.5;

N: >0.05 wt. %, and ≤4.1 wt. %, N being Ti, Zr or Nb;

B: 0.90-1.2 wt. %;

Fe: 62.0-68.0 wt. %.

In the present disclosure, the content of R' is preferably 30-33 wt. %, for example, 30.63-32.52 wt. %, for another example, 30.63 wt. %, 30.72 wt. %, 30.74 wt. %, 30.75 wt. %, 30.76 wt. %, 30.77 wt. %, 30.78 wt. %, 30.8 wt. %, 30.81 wt. %, 30.82 wt. %, 30.83 wt. %, 30.84 wt. %, 30.9 wt. %, 30.91 wt. %, 30.93 wt. %, 30.94 wt. %, 30.97 wt. %, 30.98 wt. %, 30.99 wt. %, 31 wt. %, 31.02 wt. %, 31.03 wt. %, 31.05 wt. %, 31.14 wt. %, 31.4 wt. %, 31.41 wt. %, 31.44 wt. %, 31.46 wt. %, 31.54 wt. %, 31.55 wt. %, 31.56 wt. %, 31.94 wt. %, 32.03 wt. % or 32.52 wt. %, the percentage refers to the mass percentage in the R-T-B permanent magnet material.

In the present disclosure, the content of Pr is preferably ≥17.00 wt. %, more preferably 17.00-20.00 wt. %, for example, 17.08 wt. %, 17.11 wt. %, 17.12 wt. %, 17.13 wt. %, 17.14 wt. %, 17.16 wt. %, 17.18 wt. %, 17.19 wt. %, 18.13 wt. %, 18.14 wt. %, 18.15 wt. %, 18.16 wt. %, 18.17 wt. %, 18.19 wt. %, 19.09 wt. %, 19.12 wt. %, 19.13 wt. %, 19.14 wt. %, 19.15 wt. %, 19.16 wt. % or 19.17 wt. %, the percentage refers to the mass percentage in the R-T-B permanent magnet material.

In the present disclosure, the content of Nd is preferably 11-15 wt. %, for example, 11.32-14.35 wt. %, for another example, 11.32 wt. %, 11.35 wt. %, 11.36 wt. %, 11.37 wt. %, 11.39 wt. %, 11.61 wt. %, 11.62 wt. %, 11.63 wt. %, 11.64 wt. %, 11.65 wt. %, 11.84 wt. %, 11.85 wt. %, 11.87 wt. %, 12.29 wt. %, 12.32 wt. %, 12.36 wt. %, 12.37 wt. %, 12.39 wt. %, 12.58 wt. %, 12.62 wt. %, 12.63 wt. %, 12.65 wt. %, 12.66 wt. %, 12.72 wt. %, 12.82 wt. %, 12.83 wt. %, 12.84 wt. %, 12.85 wt. %, 13.32 wt. %, 13.59 wt. %, 13.64 wt. %, 13.65 wt. %, 13.67 wt. %, 13.68 wt. %, 13.78 wt. %, 13.79 wt. %, 13.83 wt. %, 13.84 wt. %, 13.89 wt. % or 14.35 wt. %, the percentage refers to the mass percentage in the R-T-B permanent magnet material;

In the present disclosure, the mass ratio of Nd to R' is preferably ≥0.3 and <0.5, for example, 0.36-0.45, for another example, 0.36, 0.37, 0.38, 0.39, 0.41, 0.42, 0.44 or 0.45.

In the present disclosure, R' further comprises R, R is a rare earth element other than Pr and Nd.

Wherein, the kind of R is preferably Y and/or Ce.

Wherein, the content of R is preferably 0-1 wt. %, for example, 0.25 wt. %, the percentage refers to the mass percentage in the R-T-B permanent magnet material.

In the present disclosure, R' further comprises a heavy rare earth element RH.

Wherein, the kind of RH can be Dy and/or Tb.

Wherein, the content of RH can be the conventional content in this field, preferably 1.0-2.5 wt. %, for example, 1.12 wt. %, 1.18 wt. %, 1.53 wt. %, 1.58 wt. %, 1.9 wt. %, 2.02 wt. % or 2.43 wt. %, the percentage refers to the mass percentage of the R-T-B permanent magnet material.

Wherein, the mass ratio of RH to R is preferably <0.253, for example, 0.04-0.08, for another example, 0.04, 0.05, 0.06 or 0.08.

When the RH comprises Tb, the content of Tb is preferably 0.5-2 wt. %, for example, 1.9 wt. %, 1.12 wt. %, 1.18 wt. % or 1.58 wt. %, the percentage refers to the mass percentage of the R-T-B permanent magnet material.

When the RH comprises Dy, the content of Dy is preferably 1.5-2.5 wt. %, for example, 1.53 wt. %, 2.43 wt. % or 2.02 wt. %, the percentage refers to the mass percentage in the R-T-B permanent magnet material.

In the present disclosure, the content of N is preferably 0.1-4.01 wt. %, for example, 0.13 wt. %, 0.24 wt. %, 0.26 wt. %, 0.28 wt. %, 0.29 wt. %, 0.3 wt. %, 0.31 wt. %, 0.32 wt. %, 0.34 wt. %, 0.35 wt. %, 0.39 wt. %, 0.4 wt. %, 0.42 wt. %, 0.44 wt. %, 0.48 wt. %, 0.5 wt. %, 0.6 wt. %, 0.99 wt. %, 1.01 wt. %, 1.49 wt. %, 1.51 wt. %, 1.99 wt. %, 2.01 wt. %, 2.98 wt. %, 2.99 wt. % or 4.01 wt. %, further preferably 0.1-0.5 wt. %, the percentage refers to the mass percentage in the R-T-B permanent magnet material.

When the N is Zr, the content of Zr is preferably 0.20-4.01 wt. %, for example, 0.24 wt. %, 0.28 wt. %, 0.30 wt. %, 0.31 wt. %, 0.32 wt. %, 0.42 wt. %, 0.99 wt. %, 1.49 wt. %, 1.99 wt. %, 2.99 wt. % or 4.01 wt. %, the percentage refers to the mass percentage in the R-T-B permanent magnet material.

When the N is Ti, the content of Ti is preferably ≥0.25 wt. %, more preferably 0.25-4.01 wt. %, further preferably 0.25-0.50 wt. %, for example, 0.28 wt. %, 0.29 wt. %, 0.31 wt. %, 0.32 wt. %, 0.34 wt. %, 0.35 wt. %, 0.39 wt. %, 0.4 wt. %, 0.42 wt. %, 0.44 wt. %, 0.48 wt. %, 0.5 wt. %, 0.6 wt. %, 1.01 wt. %, 1.51 wt. %, 2.01 wt. %, 2.98 wt. % or 4.01 wt. %, the percentage refers to the mass percentage in the R-T-B permanent magnet material.

When the N is Nb, the content of Nb is preferably ≥0.1 wt. %, more preferably 0.1-0.35 wt. %, for example, 0.13 wt. %, 0.26 wt. %, 0.28 wt. %, 0.29 wt. %, 0.31 wt. % or 0.32 wt. %, the percentage refers to the mass percentage in the R-T-B permanent magnet material.

In the present disclosure, the content of B is preferably 0.9-1.0 wt. %, for example, 0.91 wt. %, 0.98 wt. % or 0.99 wt. %, the percentage refers to the mass percentage in the R-T-B permanent magnet material.

In the present disclosure, the content of Fe is preferably 62.3-68.0 wt. %, for example, 62.34 wt. %, 62.87 wt. %, 62.98 wt. %, 63.01 wt. %, 63.49 wt. %, 63.67 wt. %, 63.71 wt. %, 63.78 wt. %, 63.98 wt. %, 64.00 wt. %, 64.15 wt. %, 64.21 wt. %, 64.78 wt. %, 65.02 wt. %, 65.24 wt. %, 65.27 wt. %, 66.03 wt. %, 66.18 wt. %, 66.20 wt. %, 66.52 wt. %, 66.55 wt. %, 66.57 wt. %, 66.74 wt. %, 66.82 wt. %, 66.92 wt. %, 66.93 wt. %, 67.01 wt. %, 67.02 wt. %, 67.04 wt. %, 67.15 wt. %, 67.19 wt. %, 67.23 wt. %, 67.24 wt. %, 67.27 wt. %, 67.29 wt. %, 67.31 wt. %, 67.32 wt. %, 67.35 wt. %, 67.37 wt. %, 67.40 wt. %, 67.42 wt. %, 67.43 wt. %, 67.47 wt. %, 67.48 wt. %, 67.53 wt. %, 67.54 wt. %, 67.56 wt. %, 67.62 wt. %, 67.70 wt. %, 67.71 wt. %, 67.75 wt. %, 67.81 wt. %, 67.84 wt. %, 67.94 wt. %, 67.95 wt. % or 67.98 wt. %, the percentage refers to the mass percentage in the R-T-B permanent magnet material.

In the present disclosure, the R-T-B permanent magnet material further comprises one or more of Cu, Al, Ga and Co.

Wherein, the content of Cu can be the conventional content in this field, preferably ≥0.30 wt. %, more preferably 0.30-0.55 wt. %, for example, 0.33 wt. %, 0.34 wt. %, 0.37 wt. %, 0.38 wt. %, 0.39 wt. %, 0.4 wt. %, 0.41 wt. %, 0.42 wt. %, 0.44 wt. %, 0.45 wt. %, 0.49 wt. %, 0.51 wt. % or 0.52 wt. %, the percentage refers to the mass percentage in the R-T-B permanent magnet material.

Wherein, the content of Al can be the conventional content in this field, preferably 0-0.8 wt. %, but not 0, more preferably 0.041-0.70 wt. %, for example, 0.041 wt. %, 0.043 wt. %, 0.1 wt. %, 0.2 wt. %, 0.31 wt. %, 0.32 wt. %, 0.38 wt. %, 0.41 wt. %, 0.48 wt. %, 0.49 wt. %, 0.50 wt. %, 0.58 wt. %, 0.59 wt. %, 0.60 wt. %, 0.61 wt. %, 0.62 wt. %, 0.69 wt. % or 0.70 wt. %, the percentage refers to the mass percentage in the R-T-B permanent magnet material.

Wherein, the content of Ga can be the conventional content in this field, Ga is preferably 0.0-0.85 wt. %, but not 0, more preferably 0.21-0.81 wt. %, for example, 0.21 wt. %, 0.23 wt. %, 0.38 wt. %, 0.39 wt. %, 0.40 wt. %, 0.41 wt. %, 0.42 wt. %, 0.43 wt. %, 0.58 wt. %, 0.59 wt. % or 0.81 wt. %, the percentage refers to the mass percentage in the R-T-B permanent magnet material.

Wherein, the content of Co can be the conventional content in this field, the content of Co is preferably 0.0-3.0 wt. %, but not 0, more preferably 0.4-3.0 wt. %, for example, 0.49 wt. %, 0.51 wt. %, 0.95 wt. %, 1.1 wt. %, 2.35 wt. %, 2.4 wt. %, 2.42 wt. %, 2.45 wt. %, 2.51 wt. % or 2.53 wt. %, the percentage refers to the mass percentage in the R-T-B permanent magnet material.

In the present disclosure, the R-T-B permanent magnet material further comprises common addition element M, such as one or more of Ni, Zn, Ag, In, Sn, Bi, V, Cr, Hf, Ta, and W.

Wherein, the kind of M is preferably Cr.

Wherein, the content of M is preferably 0-0.15 wt. %, but not 0, for example, 0.05 wt. % or 0.12 wt. %.

In a preferred embodiment of the present disclosure, the R-T-B permanent magnet material comprises the following components: R': 29.5-33.0 wt. %, Pr≥17.00 wt. %, N: 0.1-4.01 wt. %, Cu: 0.30-0.55 wt. %, B: 0.9-1.0 wt. %, Fe: 62.0-68.0 wt. %, the percentage refers to the mass percentage in the R-T-B permanent magnet material.

When the N is Zr, the content of N is preferably 0.25-0.35 wt. %, the content of Cu is preferably 0.30-0.41 wt. %, for example, Zr 0.32 wt. %, Cu 0.33 wt. %, Zr 0.31 wt. %, Cu 0.41 wt. %, or, Zr 0.28 wt. %, Cu 0.39 wt. %, the percentage refers to the mass percentage in the R-T-B permanent magnet material.

When the N is Ti, the content of N is preferably 0.30-0.60 wt. %, the content of Cu is preferably 0.34-0.51 wt. %. The content of Ti is preferably 0.31 wt. %, 0.32 wt. %, 0.34 wt. %, 0.4 wt. %, 0.42 wt. %, 0.44 wt. %, 0.5 wt. % or 0.6 wt. %, the percentage refers to the mass percentage in the R-T-B permanent magnet material. The content of Cu is preferably 0.34 wt. %, 0.38 wt. %, 0.4 wt. %, 0.41 wt. %, 0.44 wt. %, 0.45 wt. % or 0.51 wt. %, the percentage refers to the mass percentage in the R-T-B permanent magnet material.

When the N is Nb, the content of N is preferably 0.25-0.35 wt. %, the content of Cu is preferably 0.40-0.55 wt. %. The content of Nb is preferably 0.28 wt. %, 0.29 wt. %, 0.31 wt. % or 0.32 wt. %, the percentage refers to the mass percentage in the R-T-B permanent magnet material. The content of Cu is preferably 0.37 wt. %, 0.38 wt. %, 0.41 wt. %, 0.42 wt. %, 0.49 wt. % or 0.52 wt. %, the percentage refers to the mass percentage in the R-T-B permanent magnet material.

In a preferred embodiment of the present disclosure, the R-T-B permanent magnet material comprises the following components: R': 29.5-33.0 wt. %, Pr≥17.00 wt. %, N: 0.2-0.6 wt. %, Al: 0-0.8 wt. %, but not 0, B: 0.9-1.0 wt. %, Fe: 62.0-68.0 wt. %, the percentage refers to the mass percentage in the R-T-B permanent magnet material.

When the N is Zr, the content of N is preferably 0.25-0.35 wt. %, the content of Al is preferably 0.40-0.70 wt. %, the content of Zr is preferably 0.28 wt. %, 0.31 wt. %, or 0.32 wt. %, the percentage refers to the mass percentage in the R-T-B permanent magnet material. The content of Al is preferably 0.49 wt. %, 0.5 wt. %, 0.59 wt. % or 0.62 wt. %, the percentage refers to the mass percentage in the R-T-B permanent magnet material.

When the N is Ti, the content of N is preferably 0.25-0.60 wt. %, the content of Al is preferably 0.041-0.7 wt. %. The content of Ti is preferably 0.28 wt. %, 0.31 wt. %, 0.32 wt. %, 0.34 wt. %, 0.35 wt. %, 0.39 wt. % 0.42 wt. %, 0.44 wt. %, 0.5 wt. % or 0.6 wt. %, the percentage refers to the mass percentage in the R-T-B permanent magnet material. The content of Al is preferably 0.041 wt. %, 0.043 wt. %, 0.1 wt. %, 0.2 wt. %, 0.31 wt. %, 0.32 wt. % 0.38 wt. %, 0.41 wt. %, 0.48 wt. %, 0.6 wt. % or 0.62 wt. %, the percentage refers to the mass percentage in the R-T-B permanent magnet material.

When the N is Nb, the content of N is preferably 0.25-0.35 wt. %, the content of Al is preferably 0.60-0.80 wt. %. The content of Nb is preferably 0.28 wt. %, 0.29 wt. %, 0.31 wt. %, or 0.32 wt. %, the percentage refers to the mass percentage in the R-T-B permanent magnet material. The content of Al is preferably 0.58 wt. %, 0.59 wt. %, 0.61 wt. %, 0.62 wt. %, 0.69 wt. %, or 0.7 wt. %, the percentage refers to the mass percentage in the R-T-B permanent magnet material.

In a preferred embodiment of the present disclosure, the R-T-B permanent magnet material comprises the following components: R': 29.5-33.0 wt. %, Pr≥17.00 wt. %, N: 0.2-0.6 wt. %, Ga: 0-0.81 wt. %, but not 0, B: 0.9-1.0 wt. %, Fe: 62.0-68.0 wt. %, the percentage refers to the mass percentage in the R-T-B permanent magnet material.

When the N is Zr, the content of N is preferably 0.25-0.35 wt. %, the content of Ga is preferably 0.20-0.45 wt. %. The content of Zr is preferably 0.28 wt. %, 0.31 wt. % or 0.32 wt. %, the percentage refers to the mass percentage in the R-T-B permanent magnet material. The content of Ga is preferably 0.21 wt. %, 0.41 wt. % or 0.42 wt. %, the percentage refers to the mass percentage in the R-T-B permanent magnet material.

When the N is Ti, the content of N is preferably 0.25-0.50 wt. %, the content of Ga is preferably 0.2-0.81 wt. %. The content of Ti is preferably 0.28 wt. %, 0.29 wt. %, 0.31 wt. %, 0.34 wt. % or 0.42 wt. %, the percentage refers to the mass percentage in the R-T-B permanent magnet material. The content of Ga is preferably 0.23 wt. %, 0.39 wt. %, 0.41 wt. %, 0.58 wt. % or 0.81 wt. %, the percentage refers to the mass percentage in the R-T-B permanent magnet material.

When the N is Nb, the content of N is preferably 0.25-0.35 wt. %, the content of Ga is preferably 0.30-0.60 wt. %. The content of Nb is preferably 0.28 wt. %, 0.29 wt. %, 0.31 wt. % or 0.32 wt. %, the percentage refers to the mass percentage in the R-T-B permanent magnet material. The content of Ga is preferably 0.38 wt. %, 0.4 wt. %, 0.41 wt. %, 0.42 wt. %, 0.43 wt. %, 0.58 wt. % or 0.59 wt. %, the percentage refers to the mass percentage in the R-T-B permanent magnet material.

In a preferred embodiment of the present disclosure, the R-T-B permanent magnet material comprises the following components: R': 29.5-33.0 wt. %, Pr≥17.00 wt. %, N: 0.2-0.6 wt. %, Cu: 0.30-0.55 wt. %, Al: 0-0.8 wt. %, but not 0, B: 0.9-1.0 wt. %, Fe: 62.0-68.0 wt. %, the percentage refers to the mass percentage in the R-T-B permanent magnet material.

Wherein, the content of N is preferably 0.28-0.6 wt. %, for example, 0.28 wt. %, 0.29 wt. %, 0.31 wt. %, 0.32 wt. %, 0.34 wt. %, 0.42 wt. %, 0.44 wt. %, 0.5 wt. % or 0.6 wt. %, the percentage refers to the mass percentage in the R-T-B permanent magnet material.

Wherein, the content of Cu is preferably 0.33-0.52 wt. %, for example, 0.33 wt. %, 0.34 wt. %, 0.37 wt. %, 0.38 wt. %, 0.39 wt. %, 0.4 wt. %, 0.41 wt. %, 0.42 wt. %, 0.45 wt. %, 0.51 wt. % or 0.52 wt. %, the percentage refers to the mass percentage in the R-T-B permanent magnet material.

Wherein, the content of Al is preferably 0.043-0.69 wt. %, for example, 0.043 wt. %, 0.1 wt. %, 0.2 wt. %, 0.32 wt. %, 0.41 wt. %, 0.48 wt. %, 0.49 wt. %, 0.58 wt. %, 0.59 wt. %, 0.61 wt. %, 0.62 wt. % or 0.69 wt. %, the percentage refers to the mass percentage in the R-T-B permanent magnet material.

In a preferred embodiment of the present disclosure, the R-T-B permanent magnet material comprises the following components: R': 29.5-33.0 wt. %, Pr≥17.00 wt. %, N: 0.25-0.35 wt. %, Cu: 0.30-0.55 wt. %, Al: 0.45-0.7 wt. %, Ga: 0.2-0.6 wt. %, Co: 0.5-3.0 wt. %, B: 0.9-1.0 wt. %, Fe: 62.0-68.0 wt. %, the percentage refers to the mass percentage in the R-T-B permanent magnet material.

Wherein, the content of N is preferably 0.28-0.6 wt. %, for example, 0.28 wt. %, 0.29 wt. %, 0.31 wt. % or 0.32 wt. %, the percentage refers to the mass percentage in the R-T-B permanent magnet material.

Wherein, the content of Cu is preferably 0.33-0.52 wt. %, for example, 0.33 wt. %, 0.37 wt. %, 0.38 wt. %, 0.39 wt. %, 0.41 wt. %, 0.42 wt. % or 0.52 wt. %, the percentage refers to the mass percentage in the R-T-B permanent magnet material.

Wherein, the content of Al is preferably 0.49-0.69 wt. %, for example, 0.49 wt. %, 0.58 wt. %, 0.59 wt. %, 0.61 wt. %, 0.62 wt. % or 0.69 wt. %, the percentage refers to the mass percentage in the R-T-B permanent magnet material.

Wherein, the content of Ga is preferably 0.20-0.69 wt. %, for example, 0.21 wt. %, 0.38 wt. %, 0.39 wt. %, 0.4 wt. %, 0.41 wt. %, 0.42 wt. %, 0.43 wt. % or 0.59 wt. %, the percentage refers to the mass percentage in the R-T-B permanent magnet material.

Wherein, the content of Co is preferably 0.5-2.6 wt. %, for example, 0.51 wt. %, 1.1 wt. %, 2.35 wt. %, 2.4 wt. %, 2.42 wt. %, 2.45 wt. %, 2.51 wt. % or 2.53 wt. %, the percentage refers to the mass percentage in the R-T-B permanent magnet material.

In a preferred embodiment of the present disclosure, the R-T-B permanent magnet material comprises the following components: R': 29.5-33.0 wt. %, Pr≥17.00 wt. %, N: 0.25-0.35 wt. %, Cr: 0-0.15 wt. %, Cu: 0.30-0.55 wt. %, Al: 0.45-0.7 wt. %, Ga: 0.2-0.6 wt. %, Co: 0.5-3.0 wt. %, B: 0.9-1.0 wt. %, Fe: 62.0-68.0 wt. %, the percentage refers to the mass percentage in the R-T-B permanent magnet material.

In a preferred embodiment of the present disclosure, the R-T-B permanent magnet material comprises the following components: R': 29.5-33.0 wt. %, Pr≥17.00 wt. %, RH: 1.0-2.5 wt. %, N: 0.25-0.35 wt. %, Cu: 0.30-0.55 wt. %, Al: 0.45-0.7 wt. %, Ga: 0.2-0.6 wt. %, Co: 0.5-3.0 wt. %, B: 0.9-1.0 wt. %, Fe: 62.0-68.0 wt. %, the percentage refers to the mass percentage in the R-T-B permanent magnet material.

The present disclosure further provides a raw material composition of R-T-B permanent magnet material, which comprises the following components by mass percentage:

R': 29.5-32.0 wt. %, R' comprising R and Pr, Nd; wherein:
 R is a rare earth element other than Pr and Nd, the content of Pr is ≥8.85 wt. %, the mass ratio of Nd to R' is <0.5;

N: >0.05 wt. %, and ≤4.0 wt. %, N being Ti, Zr or Nb;

B: 0.90-1.2 wt. %;

Fe: 62.0-68.0 wt. %.

In the present disclosure, the content of R' is preferably 30.0-32.0 wt. %, further preferably 30.7-32.0 wt. %, for example, 30.7 wt. %, 30.8 wt. %, 31.0 wt. %, 31.5 wt. % or 32.0 wt. %, the percentage refers to the mass percentage in the raw material composition of R-T-B permanent magnet material.

In the present disclosure, the content of Pr is preferably ≥17.15 wt. %, more preferably 17.15-19.15 wt. %, for example, 17.15 wt. %, 18.15 wt. % or 19.15 wt. %, the percentage refers to the mass percentage in the raw material composition of R-T-B permanent magnet material.

In the present disclosure, the content of Nd is preferably 11.00-15.00 wt. %, further preferably 11.35-14.35 wt. %, for example, 11.35 wt. %, 11.65 wt. %, 11.85 wt. %, 12.35 wt. %, 12.65 wt. %, 12.85 wt. %, 13.35 wt. %, 13.65 wt. %, 13.85 wt. % or 14.35 wt. %, the percentage refers to the mass percentage in the raw material composition of R-T-B permanent magnet material.

In the present disclosure, the mass ratio of Nd to R' is preferably ≥0.3 and <0.5, preferably 0.35-0.46, for example, 0.35, 0.36, 0.37, 0.38, 0.39, 0.41, 0.42, 0.43, 0.44, 0.45 or 0.46.

In the present disclosure, R' further comprises R, R is a rare earth element other than Pr and Nd.

Wherein, the kind of R is preferably Y and/or Ce.

Wherein, the content of R is preferably 0-1 wt. %, for example, 0.3 wt. %, the percentage refers to the mass percentage in the raw material composition of R-T-B permanent magnet material.

In the present disclosure, R' further comprises a heavy rare earth element RH.

Wherein, the kind of RH is preferably Dy and/or Tb.

Wherein, the content of RH can be the conventional content in this field, preferably 1.0-2.5 wt. %, for example, 1.2 wt. %, 1.5 wt. %, 2.0 wt. % or 2.5 wt. %, the percentage refers to the mass percentage in the raw material composition of R-T-B permanent magnet material.

Wherein, the mass ratio of RH to R' is preferably <0.253, for example, 0.04-0.08, for another example, 0.04, 0.05, 0.06 or 0.08.

When the RH comprises Tb, the content of Tb is preferably 0.5-2 wt. %, for example, 1.2 wt. % or 2.0 wt. %, the percentage refers to the mass percentage in the raw material composition of R-T-B permanent magnet material.

When the RH comprises Dy, the content of Dy is preferably 1.5-2.5 wt. %, for example, 1.5 wt. % or 2.5 wt. %, the percentage refers to the mass percentage in the raw material composition of R-T-B permanent magnet material.

In the present disclosure, the content of N is preferably 0.15-4 wt. %, for example, 0.15 wt. %, 0.25 wt. %, 0.3 wt. %, 0.35 wt. %, 0.4 wt. %, 0.45 wt. %, 0.5 wt. %, 0.6 wt. %, 1.0 wt. %, 1.5 wt. %, 2.0 wt. %, 3.0 wt. % or 4.0 wt. %, the percentage refers to the mass percentage in the raw material composition of R-T-B permanent magnet material.

When the N is Zr, the content of Zr is preferably 0.25-4.0 wt. %, for example, 0.25 wt. %, 0.3 wt. %, 0.4 wt. %, 1.0 wt. %, 1.5 wt. %, 2.0 wt. %, 3.0 wt. % or 4.0 wt. %, the percentage refers to the mass percentage in the raw material composition of R-T-B permanent magnet material.

When the N is Ti, the content of Ti is preferably ≥0.3 wt. %, for example, 0.30 wt. %, 0.35 wt. %, 0.40 wt. %, 0.45 wt. %, 0.50 wt. %, 0.60 wt. %, 1.0 wt. %, 1.5 wt. %, 2.0 wt. %, 3.0 wt. % or 4.0 wt. %, more preferably 0.30-0.50 wt. %, the percentage refers to the mass percentage in the R-T-B permanent magnet material.

When the N is Nb, the content of Nb is preferably 0.15-0.30 wt. %, for example, 0.15 wt. %, 0.25 wt. % or 0.30 wt. %, the percentage refers to the mass percentage in the raw material composition of R-T-B permanent magnet material.

In the present disclosure, the content of B is preferably ≥0.985 wt. %, for example, 0.985 wt. % or 0.99 wt. %.

In the present disclosure, the content of Fe is 62.81-67.92 wt. %, for example, 62.81 wt. %, 62.92 wt. %, 63.31 wt. %, 63.70 wt. %, 63.77 wt. %, 63.81 wt. %, 64.02 wt. %, 64.11 wt. %, 64.22 wt. %, 64.72 wt. %, 65.02 wt. %, 65.22 wt. %, wt. %, 65.52 wt. %, 66.02 wt. %, 66.18 wt. %, 66.22 wt. %, 66.52 wt. %, 66.62 wt. %, 66.72 wt. %, 66.77 wt. %, 66.92 wt. %, 66.97 wt. %, 67.02 wt. %, 67.17 wt. %, 67.22 wt. %, 67.24 wt. %, 67.27 wt. %, 67.32 wt. %, 67.37 wt. %, 67.38 wt. %, 67.42 wt. %, 67.52 wt. %, 67.53 wt. %, 67.57 wt. %, 67.62 wt. %, 67.67 wt. %, 67.72 wt. %, 67.80 wt. %, 67.82 wt. %, 67.85 wt. %, 67.87 wt. % or 67.92 wt. %, the percentage refers to the mass percentage in the raw material composition of R-T-B permanent magnet material.

In the present disclosure, the raw material composition of R-T-B permanent magnet material further comprises one or more of Al, Cu, Ga and Co.

Wherein, the content of Cu can be the conventional content in this field, preferably ≥0.34 wt. %, more preferably 0.34-0.5 wt. %, for example, 0.34 wt. %, 0.38 wt. %, 0.40 wt. %, 0.45 wt. % or 0.50 wt. %, the percentage refers to the mass percentage in the raw material composition of R-T-B permanent magnet material.

Wherein, the content of Al can be the conventional content in this field, preferably 0.042-0.7 wt. %, for example, 0.042 wt. %, 0.1 wt. %, 0.2 wt. %, 0.3 wt. %, 0.4 wt. %, 0.5 wt. %, 0.6 wt. % or 0.7 wt. %, the percentage refers to the mass percentage in the raw material composition of R-T-B permanent magnet material.

Wherein, the content of Ga can be the conventional content in this field, preferably 0.0-0.8 wt. %, but not 0, more preferably 0.2-0.8 wt. %, for example, 0.2 wt. %, 0.25 wt. %, 0.4 wt. %, 0.6 wt. % or 0.8 wt. %, the percentage refers to the mass percentage in the raw material composition of R-T-B permanent magnet material.

Wherein, the content of Co can be the conventional content in this field, preferably 0.0-3.0 wt. %, but not 0, more preferably 0.5-2.5 wt. %, for example, 0.5 wt. %, 1.0 wt. % or 2.5 wt. %, the percentage refers to the mass percentage in the raw material composition of R-T-B permanent magnet material.

In the present disclosure, the raw material composition of R-T-B permanent magnet material further comprises common addition element M, such as one or more of Ni, Zn, Ag, In, Sn, Bi, V, Cr, Hf, Ta, and W.

Wherein, the kind of M is preferably Cr.

Wherein, the content of M is preferably 0-0.15 wt. %, but not 0, for example, 0.05 wt. % or 0.12 wt. %, the percentage refers to the mass percentage in the raw material composition of R-T-B permanent magnet material.

As a preferred embodiment of the present disclosure, the R-T-B permanent magnet material comprises the following components: R': 29.5-32.0 wt. %, Pr≥17.15 wt. %, N: 0.3-0.6 wt. %, Cu: 0.34-0.55 wt. %, B: 0.9-1.0 wt. %, Fe: 62.0-68.0 wt. %, the percentage refers to the mass percentage in the raw material composition of R-T-B permanent magnet material.

When the N is Zr, the content of N is preferably 0.25-0.35 wt. %, the content of Cu is preferably 0.34-0.40 wt. %, for example, Zr 0.30 wt. %, Cu 0.34 wt. %, or, Zr 0.30 wt. %, Cu 0.40 wt. %, the percentage refers to the mass percentage in the raw material composition of R-T-B permanent magnet material.

When the N is Ti, the content of N is preferably 0.30-0.60 wt. %, the content of Cu is preferably 0.34-0.5 wt. %. The the content of Ti is preferably 0.3 wt. %, 0.35 wt. %, 0.4 wt.

%, 0.45 wt. %, 0.5 wt. % or 0.6 wt. %, the percentage refers to the mass percentage in the raw material composition of R-T-B permanent magnet material. The content of Cu is preferably 0.34 wt. %, 0.38 wt. %, 0.4 wt. %, 0.45 wt. % or 0.5 wt. %, the percentage refers to the mass percentage in the raw material composition of R-T-B permanent magnet material.

When the N is Nb, the content of N is preferably 0.25-0.35 wt. %, the content of Cu is preferably 0.4-0.5 wt. %. The content of Nb is preferably 0.30 wt. %, the content of Cu is preferably 0.4 wt. % or 0.5 wt. %, the percentage refers to the mass percentage in the raw material composition of R-T-B permanent magnet material.

As a preferred embodiment of the present disclosure, the R-T-B permanent magnet material comprises the following components: R': 29.5-32.0 wt. %, Pr≥17.15 wt. %, N: 0.2-0.6 wt. %, Al: 0-0.8 wt. %, but not 0, B: 0.9-1.0 wt. %, Fe: 62.0-68.0 wt. %, the percentage refers to the mass percentage in the raw material composition of R-T-B permanent magnet material.

When the N is Zr, the content of N is preferably 0.25-0.35 wt. %, the content of Al is preferably 0.5-0.6 wt. %. The content of Zr is preferably 0.3 wt. %, the content of Al is preferably 0.5 wt. % or 0.6 wt. %, the percentage refers to the mass percentage in the raw material composition of R-T-B permanent magnet material.

When the N is Ti, the content of N is preferably 0.30-0.60 wt. %, the content of Al is preferably 0.042-0.6 wt. %. The content of Ti is preferably 0.3 wt. %, 0.35 wt. %, 0.4 wt. %, 0.45 wt. %, 0.5 wt. % or 0.6 wt. %, the percentage refers to the mass percentage in the raw material composition of R-T-B permanent magnet material. The content of Al is preferably 0.042 wt. %, 0.1 wt. %, 0.2 wt. %, 0.3 wt. %, 0.4 wt. %, 0.5 wt. % or 0.6 wt. %, the percentage refers to the mass percentage in the raw material composition of R-T-B permanent magnet material.

When the N is Nb, the content of N is preferably 0.25-0.35 wt. %, the content of Al is preferably 0.60-0.70 wt. %. The content of Nb is preferably 0.30 wt. %, the content of Al is preferably 0.60 wt. % or 0.70 wt. %, the percentage refers to the mass percentage in the raw material composition of R-T-B permanent magnet material.

As a preferred embodiment of the present disclosure, the R-T-B permanent magnet material comprises the following components: R': 29.5-32.0 wt. %, Pr≥17.15 wt. %, N: 0.3-0.4 wt. %, Ga: 0.2-0.8 wt. %, B: 0.9-1.0 wt. %, Fe: 62.0-68.0 wt. %, the percentage refers to the mass percentage in the raw material composition of R-T-B permanent magnet material.

When the N is Zr, the content of N is preferably 0.25-0.35 wt. %, the content of Ga is preferably 0.2-0.4 wt. %. The content of Zr is preferably 0.3 wt. %, the content of Ga is preferably 0.2 wt. % or 0.4 wt. %, the percentage refers to the mass percentage in the raw material composition of R-T-B permanent magnet material.

When the N is Ti, the content of N is preferably 0.3-0.4 wt. %, the content of Ga is preferably 0.25-0.8 wt. %. The content of Ti is preferably 0.3 wt. %, 0.35 wt. % or 0.4 wt. %, the percentage refers to the mass percentage in the raw material composition of R-T-B permanent magnet material. The content of Ga is preferably 0.25 wt. %, 0.4 wt. %, 0.6 wt. % or 0.8 wt. %, the percentage refers to the mass percentage in the raw material composition of R-T-B permanent magnet material.

When the N is Nb, the content of N is preferably 0.25-0.35 wt. %, the content of Ga is preferably 0.40-0.60 wt. %, the content of Nb is preferably 0.3 wt. %, the content of Ga is preferably 0.4 wt. % or 0.60 wt. %, the percentage refers to the mass percentage in the raw material composition of R-T-B permanent magnet material.

As a preferred embodiment of the present disclosure, the R-T-B permanent magnet material comprises the following components: R': 29.5-32.0 wt. %, Pr≥17.15 wt. %, N: 0.2-0.6 wt. %, Cu: 0.30-0.5 wt. %, Al: 0-0.8 wt. %, but not 0, B: 0.9-1.0 wt. %, Fe: 62.0-68.0 wt. %, the percentage refers to the mass percentage in the raw material composition of R-T-B permanent magnet material.

Wherein, the content of N is preferably 0.25-0.3 wt. %, for example, 0.3 wt. %, 0.35 wt. %, 0.4 wt. %, 0.45 wt. %, 0.5 wt. % or 0.6 wt. %, the percentage refers to the mass percentage in the raw material composition of R-T-B permanent magnet material.

Wherein, the content of Cu is preferably 0.34-0.52 wt. %, for example, 0.34 wt. %, 0.38 wt. %, 0.4 wt. %, 0.45 wt. % or 0.5 wt. %, the percentage refers to the mass percentage in the raw material composition of R-T-B permanent magnet material.

Wherein, the content of Al is preferably 0.042-0.7 wt. %, for example, 0.042 wt. %, 0.1 wt. %, 0.2 wt. %, 0.3 wt. %, 0.4 wt. %, 0.5 wt. %, 0.6 wt. % or 0.7 wt. %, the percentage refers to the mass percentage in the raw material composition of R-T-B permanent magnet material.

As a preferred embodiment of the present disclosure, the R-T-B permanent magnet material comprises the following components: R': 29.5-32.0 wt. %, Pr≥17.15 wt. %, N: 0.25-0.35 wt. %, Cu: 0.3-0.5 wt. %, Al: 0.5-0.7 wt. %, Ga: 0.2-0.6 wt. %, Co: 0.5-3.0 wt. %, B: 0.9-1.0 wt. %, Fe: 62.0-68.0 wt. %, the percentage refers to the mass percentage in the raw material composition of R-T-B permanent magnet material.

Wherein, the content of N is preferably 0.25-0.3 wt. %, for example, 0.3 wt. %, the percentage refers to the mass percentage in the raw material composition of R-T-B permanent magnet material.

Wherein, the content of Cu is preferably 0.34-0.5 wt. %, for example, 0.34 wt. %, 0.4 wt. % or 0.5 wt. %, the percentage refers to the mass percentage in the raw material composition of R-T-B permanent magnet material.

Wherein, the content of Al is preferably 0.5-0.7 wt. %, for example, 0.5 wt. %, 0.6 wt. % or 0.7 wt. %, the percentage refers to the mass percentage in the raw material composition of R-T-B permanent magnet material.

Wherein, the content of Ga is preferably 0.2-0.6 wt. %, for example, 0.2 wt. %, 0.4 wt. % or 0.6 wt. %, the percentage refers to the mass percentage in the raw material composition of R-T-B permanent magnet material.

Wherein, the content of Co is preferably 0.5-2.5 wt. %, for example, 0.5 wt. %, 1.0 wt. % or 2.5 wt. %, the percentage refers to the mass percentage in the raw material composition of R-T-B permanent magnet material.

As a preferred embodiment of the present disclosure, the R-T-B permanent magnet material comprises the following components: R': 29.5-32.0 wt. %, Pr≥17.15 wt. %, N: 0.25-0.35 wt. %, Cu: 0.3-0.5 wt. %, Al: 0.5-0.7 wt. %, Ga: 0.2-0.6 wt. %, Co: 0.5-3.0 wt. %, Cr: 0-0.15 wt. %, B: 0.9-1.0 wt. %, Fe: 62.0-68.0 wt. %, the percentage refers to the mass percentage in the raw material composition of R-T-B permanent magnet material.

As a preferred embodiment of the present disclosure, the R-T-B permanent magnet material comprises the following components: R': 29.5-32.0 wt. %, Pr≥17.15 wt. %, RH: 1.0-2.5 wt. %, N: 0.25-0.35 wt. %, Cu: 0.30-0.55 wt. %, Al: 0.45-0.7 wt. %, Ga: 0.2-0.6 wt. %, Co: 0.5-3.0 wt. %, B: 0.9-1.0 wt. %, Fe: 62.0-68.0 wt. %, the percentage refers to the mass percentage in the raw material composition of R-T-B permanent magnet material.

The present disclosure further provides a preparation method for the R-T-B permanent magnet material, which comprises the following steps: the molten liquid of the raw material composition of the R-T-B permanent magnet material is subjected to casting, hydrogen decrepitation, forming, sintering and aging.

Wherein, the molten liquid of the raw material composition of R-T-B permanent magnet material is prepared by the conventional preparation method in this field, for example, melting in a high frequency vacuum induction melting furnace. The vacuum degree of the melting furnace can be $5\times10^{-2}$ Pa. The melting temperature can be 1500° C. or less.

Wherein, the casting process is conventional casting process in this field, for example, cooling at a rate of $10^{2}$° C./s $-10^{4}$° C./s in an Ar atmosphere (for example, an Ar atmosphere of $5.5\times10^{4}$ MPa).

Wherein, the hydrogen decrepitation process is conventional hydrogen decrepitation process in this field, for example, comprises hydrogen absorption, dehydrogenation and cooling treatment.

The hydrogen absorption can be carried out under the hydrogen pressure of 0.15 MPa.

The dehydrogenation can be carried out under the condition that the temperature rises while evacuation.

Wherein, after the hydrogen decrepitation process, it can also be pulverized by conventional means in this field. The pulverizing process can be a conventional pulverizing process in the field, for example, jet mill pulverization.

The jet mill pulverization can be performed in a nitrogen atmosphere with an oxidizing gas content of 150 ppm or less. The oxidizing gas refers to the oxygen or moisture content.

The pressure of the crushing chamber of the jet mill pulverization can be 0.38 MPa.

The Time of the jet mill pulverization can be 3 h.

After the pulverization, a lubricant can be added to the powder by conventional means in this field, for example, zinc stearate. The added amount of the lubricant can be 0.10-0.15%, for example, 0.12%, by weight of the mixed powder.

Wherein, the forming process can be conventional forming process in the field, for example, magnetic field forming method or a hot pressing and thermal deformation method.

Wherein, the sintering process can be conventional sintering process in this field, for example, under vacuum conditions (for example, under the vacuum of $5\times10^{-3}$ Pa), preheating, sintering and cooling.

The temperature of the preheating can be 300-600° C. The time of the preheating can be 1-2 h. Preferably, the preheating is preheating at 300° C. and 600° C. for 1 h respectively.

The temperature of the sintering can be conventional sintering temperature in this field, for example, 1040-1090° C., for another example, 1050° C.

The time of the sintering can be conventional sintering time in this field, for example, 2h.

Ar gas can be introduced to make the air pressure reach 0.1 MPa before the cooling.

Wherein, preferably, the grain boundary diffusion treatment is further carried out after sintering and before the aging treatment.

The grain boundary diffusion treatment can be conventional process in this field, for example, attaching substance containing Tb and/or substance containing Dy to the surface of the R-T-B permanent magnet material by evaporating, coating or sputtering, then carrying out diffusion heat treatment.

The substance containing Tb may be Tb metal, a Tb-containing compound (for example, a Tb-containing fluoride) or alloy.

The substance containing Dy may be Dy metal, a Dy-containing compound (for example, a Dy-containing fluoride) or alloy.

The temperature of the diffusion heat treatment is preferably 800-900° C., for example, 850° C.

The time of the diffusion heat treatment is preferably 12-48 h, for example, 24 h.

Wherein, in the aging treatment, the temperature of the secondary aging is 500-650° C., for example, 600-650° C., for another example, 630° C.

In the secondary aging, the temperature is increased to 500-650° C. with a heating rate of 3-5° C./min. The starting point for the heating can be room temperature.

The treatment time of the secondary aging can be 3 h.

The present disclosure also provides an R-T-B permanent magnet material prepared by the preparation method.

The present disclosure also provides an R-T-B permanent magnet material, wherein, the main phase crystalline particle is $R''_2Fe_{14}B$, the R" comprises Pr and Nd, the mass fraction of Pr in the R" is ≥60%.

Wherein, preferably, the components of the R-T-B permanent magnet material are as described above.

The present disclosure also provides a use of the R-T-B permanent magnet material as electronic components.

Wherein, the use can be in the automobile drive field, wind power field, servo motor and household electrical appliance field (e.g. air conditioner).

In the present disclosure, the room temperature refers to 25° C.±5° C.

On the basis of conforming to the common knowledge in this field, the above optimal conditions can be combined at will, so as to obtain better examples of the present disclosure.

The reagents and raw materials used in the present disclosure are commercially available.

The positive progressive effects of the present disclosure are as follows:

(1) The rare earth permanent magnet of the present disclosure has high coercivity, high remanence and stable temperature coefficient and can effectively solve the problem of deterioration of temperature coefficient of the permanent magnet caused by high Pr (Pr≥8.85 wt. %).

(2) The rare earth permanent magnet of the present disclosure can utilize the strong anisotropy of $Pr_2Fe_{14}B$ under the condition of no heavy rare earth to realize high coercivity, which is nearly 2kOe higher than the coercivity of conventional process, realizing significant improvement of the performance of products with no heavy rare earth, especially for products with no heavy rare earth in the fields such as automobile drive field and wind power field. At the same time, the utilization amount of the heavy rare earths is effectively saved in the products containing heavy rare earths (for example, servo, air conditioner, etc.) and the production cost is reduced.

DETAILED DESCRIPTION OF THE PREFERRED EMBODIMENT

Figure 1:
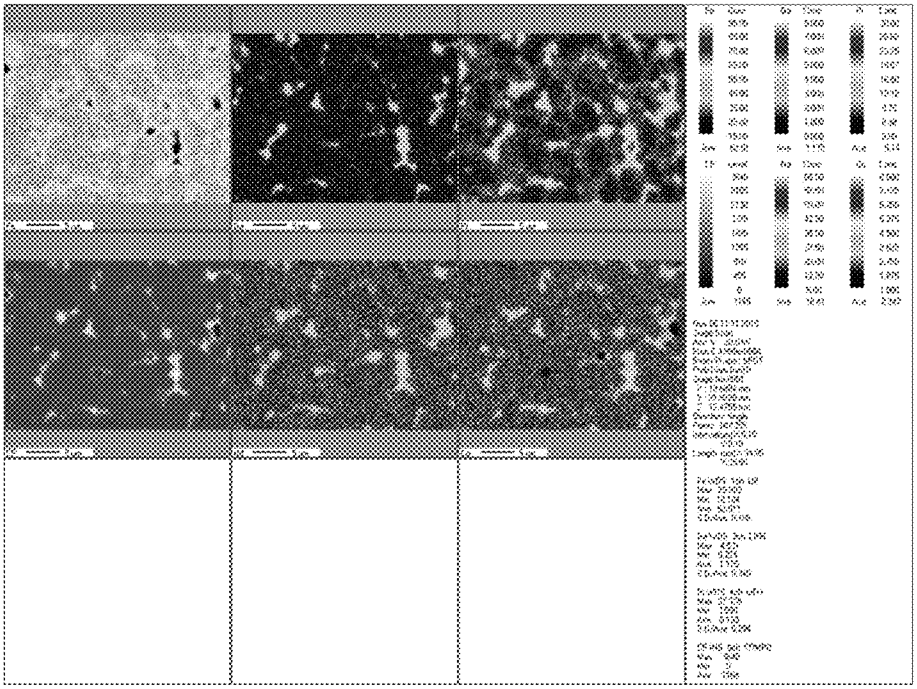
FIG. 1 is the distribution diagram of Fe, Ga, Pr, Nd and Co formed by the FE-EPMA surface scanning of the sintered magnet prepared in Embodiment 50.

The following examples further illustrate the present disclosure, but the present disclosure is not limited thereto. Below presents preferred embodiments of the present disclosure based on the drawings in order to illustrate the technical schemes of the present disclosure in detail. In the following table, wt. % refers to the percentage by mass of the component in the raw material composition of the R-T-B permanent magnet material, and "/" means that the element is not added. "Br" refers to remanence, and "Hcj" refers to intrinsic coercivity.

The formulas of R-T-B permanent magnet materials of the embodiments and comparative embodiments are shown in Table 1.

TABLE 1

| No. | R kind | R content | Nd wt. % | Pr wt. % | RH kind | RH wt. % | Cu wt. % | Al wt. % | Ga wt. % | Co wt. % | N kind | N wt. % | M kind | M wt. % | B wt. % | Fe wt. % |
|---|---|---|---|---|---|---|---|---|---|---|---|---|---|---|---|---|
| Embodiment 1 | / | / | 13.85 | 17.15 | / | / | / | / | / | / | Zr | 0.25 | / | / | 0.9 | balance |
| Embodiment 2 | / | / | 13.85 | 17.15 | / | / | / | / | / | / | Zr | 0.3 | / | / | 0.9 | balance |
| Embodiment 3 | / | / | 12.85 | 18.15 | / | / | / | / | / | / | Zr | 0.3 | / | / | 0.9 | balance |
| Embodiment 4 | / | / | 11.85 | 19.15 | / | / | / | / | / | / | Zr | 0.3 | / | / | 0.985 | balance |
| Embodiment 5 | / | / | 13.85 | 17.15 | / | / | / | | | / | Zr | 0.4 | / | / | 0.985 | balance |
| Embodiment 6 | / | / | 11.85 | 19.15 | / | / | / | / | / | / | Zr | 1.0 | / | / | 0.985 | balance |
| Embodiment 7 | / | / | 11.85 | 19.15 | / | / | / | / | / | / | Zr | 1.5 | / | / | 0.985 | balance |
| Embodiment 8 | / | / | 11.85 | 19.15 | / | / | / | / | / | / | Zr | 2.0 | / | / | 0.985 | balance |
| Embodiment 9 | / | / | 12.85 | 18.15 | / | / | / | / | / | / | Zr | 3.0 | / | / | 0.985 | balance |
| Embodiment 10 | / | / | 11.85 | 19.15 | / | / | / | / | / | / | Zr | 4.0 | / | / | 0.985 | balance |
| Embodiment 11 | / | / | 13.65 | 17.15 | / | / | / | / | / | / | Ti | 0.3 | / | / | 0.985 | balance |
| Embodiment 12 | / | / | 12.65 | 18.15 | / | / | / | / | / | / | Ti | 0.4 | / | / | 0.985 | balance |
| Embodiment 13 | / | / | 11.65 | 19.15 | / | / | / | / | / | / | Ti | 0.5 | / | / | 0.985 | balance |
| Embodiment 14 | / | / | 11.65 | 19.15 | / | / | / | / | / | / | Ti | 1 | / | / | 0.985 | balance |
| Embodiment 15 | / | / | 11.65 | 19.15 | / | / | / | / | / | / | Ti | 1.5 | / | / | 0.985 | balance |
| Embodiment 16 | / | / | 11.65 | 19.15 | / | / | / | / | / | / | Ti | 2.0 | / | / | 0.985 | balance |
| Embodiment 17 | / | / | 11.65 | 19.15 | / | / | / | / | / | / | Ti | 3.0 | / | / | 0.985 | balance |
| Embodiment 18 | / | / | 11.65 | 19.15 | / | / | / | / | / | / | Ti | 4.0 | / | / | 0.985 | balance |
| Embodiment 19 | / | / | 14.35 | 17.15 | / | / | / | / | / | / | Nb | 0.3 | / | / | 0.985 | balance |
| Embodiment 20 | / | / | 13.35 | 18.15 | / | / | / | / | / | / | Nb | 0.15 | / | / | 0.985 | balance |
| Embodiment 21 | / | / | 12.35 | 19.15 | / | / | / | / | / | / | Nb | 0.25 | / | / | 0.985 | balance |
| Embodiment 22 | / | / | 13.85 | 17.15 | / | / | 0.34 | / | / | / | Zr | 0.3 | / | / | 0.985 | balance |
| Embodiment 23 | / | / | 12.65 | 18.15 | / | / | 0.4 | / | / | / | Ti | 0.3 | / | / | 0.985 | balance |
| Embodiment 24 | / | / | 13.65 | 17.15 | / | / | 0.45 | / | / | / | Ti | 0.4 | / | / | 0.985 | balance |
| Embodiment 25 | / | / | 11.65 | 19.15 | / | / | 0.5 | / | / | / | Ti | 0.5 | / | / | 0.985 | balance |
| Embodiment 26 | / | / | 12.35 | 19.15 | / | / | 0.5 | / | / | / | Nb | 0.3 | / | / | 0.985 | balance |
| Embodiment 27 | / | / | 11.65 | 19.15 | / | / | / | 0.042 | / | / | Ti | 0.3 | / | / | 0.985 | balance |
| Embodiment 28 | / | / | 11.65 | 19.15 | / | / | / | 0.1 | / | / | Ti | 0.5 | / | / | 0.985 | balance |
| Embodiment 29 | / | / | 11.65 | 19.15 | / | / | / | 0.2 | / | / | Ti | 0.6 | / | / | 0.985 | balance |
| Embodiment 30 | / | / | 12.65 | 18.15 | / | / | / | 0.3 | / | / | Ti | 0.35 | / | / | 0.985 | balance |
| Embodiment 31 | / | / | 13.65 | 17.15 | / | / | / | 0.4 | / | / | Ti | 0.40 | / | / | 0.985 | balance |
| Embodiment 32 | / | / | 13.85 | 17.15 | / | / | / | 0.5 | / | / | Zr | 0.3 | / | / | 0.985 | balance |
| Embodiment 33 | / | / | 12.65 | 18.15 | / | / | / | 0.6 | / | / | Ti | 0.3 | / | / | 0.985 | balance |
| Embodiment 34 | / | / | 12.35 | 19.15 | / | / | / | 0.7 | / | / | Nb | 0.3 | / | / | 0.985 | balance |
| Embodiment 35 | / | / | 13.85 | 17.15 | / | / | / | / | 0.2 | / | Zr | 0.3 | / | / | 0.985 | balance |
| Embodiment 36 | / | / | 13.65 | 17.15 | / | / | / | / | 0.25 | / | Ti | 0.3 | / | / | 0.985 | balance |
| Embodiment 37 | / | / | 12.65 | 18.15 | / | / | / | / | 0.4 | / | Ti | 0.3 | / | / | 0.985 | balance |
| Embodiment 38 | / | / | 11.65 | 19.15 | / | / | / | / | 0.6 | / | Ti | 0.35 | / | / | 0.985 | balance |
| Embodiment 39 | / | / | 11.65 | 19.15 | / | / | / | / | 0.8 | / | Ti | 0.40 | / | / | 0.985 | balance |
| Embodiment 40 | / | / | 12.35 | 19.15 | / | / | / | / | 0.6 | / | Nb | 0.3 | / | / | 0.985 | balance |
| Embodiment 41 | / | / | 13.85 | 17.15 | / | / | / | / | / | 0.5 | Zr | 0.3 | / | / | 0.985 | balance |
| Embodiment 42 | / | / | 12.65 | 18.15 | / | / | / | / | / | 1 | Ti | 0.3 | / | / | 0.985 | balance |
| Embodiment 43 | / | / | 12.35 | 19.15 | / | / | / | / | / | 2.5 | Nb | 0.3 | / | / | 0.985 | balance |
| Embodiment 44 | / | / | 13.65 | 17.15 | / | / | 0.34 | 0.042 | / | / | Ti | 0.3 | / | / | 0.985 | balance |
| Embodiment 45 | / | / | 13.65 | 17.15 | / | / | 0.38 | 0.1 | / | / | Ti | 0.5 | / | / | 0.985 | balance |
| Embodiment 46 | / | / | 13.65 | 17.15 | / | / | 0.40 | 0.2 | / | / | Ti | 0.6 | / | / | 0.985 | balance |
| Embodiment 47 | / | / | 12.65 | 18.15 | / | / | 0.4 | 0.3 | / | / | Ti | 0.35 | / | / | 0.985 | balance |
| Embodiment 48 | / | / | 13.65 | 17.15 | / | / | 0.45 | 0.4 | / | / | Ti | 0.4 | / | / | 0.985 | balance |
| Embodiment 49 | / | / | 11.65 | 19.15 | / | / | 0.5 | 0.5 | / | / | Ti | 0.45 | / | / | 0.985 | balance |
| Embodiment 50 | / | / | 13.85 | 17.15 | / | / | 0.34 | 0.5 | 0.2 | 0.5 | Zr | 0.3 | / | / | 0.985 | balance |
| Embodiment 51 | / | / | 12.65 | 18.15 | / | / | 0.4 | 0.6 | 0.4 | 1 | Ti | 0.3 | / | / | 0.985 | balance |
| Embodiment 52 | / | / | 12.35 | 19.15 | / | / | 0.5 | 0.7 | 0.6 | 2.5 | Nb | 0.3 | / | / | 0.985 | balance |
| Embodiment 53 | / | / | 12.85 | 18.15 | / | / | 0.4 | 0.6 | 0.4 | 2.5 | Zr | 0.3 | Cr | 0.05 | 0.985 | balance |
| Embodiment 54 | / | / | 12.85 | 18.15 | / | / | 0.4 | 0.6 | 0.4 | 2.5 | Zr | 0.3 | Cr | 0.12 | 0.985 | balance |
| Embodiment 55 | / | / | 12.35 | 18.15 | Dy | 1.5 | 0.4 | 0.6 | 0.4 | 2.5 | Nb | 0.3 | / | / | 0.99 | balance |
| Embodiment 56 | / | / | 11.35 | 18.15 | Dy | 2.5 | 0.4 | 0.6 | 0.4 | 2.5 | Nb | 0.3 | / | / | 0.99 | balance |
| Embodiment 57 | / | / | 11.35 | 18.15 | Tb | 2 | 0.4 | 0.6 | 0.4 | 2.5 | Nb | 0.3 | / | / | 0.99 | balance |
| Embodiment 58 | / | / | 11.35 | 18.15 | Tb | 1.2 | 0.4 | 0.6 | 0.4 | 2.5 | Nb | 0.3 | / | / | 0.99 | balance |
| Embodiment 59 | Ce | 0.3 | 11.35 | 18.15 | Tb | 1.2 | 0.4 | 0.6 | 0.4 | 2.5 | Nb | 0.3 | / | / | 0.99 | balance |
| Comparative Embodiment 1 | / | / | 13.85 | 17.15 | / | / | / | / | / | / | Mo | 2.16 | / | / | 0.985 | balance |
| Comparative Embodiment 2 | / | / | 13.85 | 17.15 | / | / | / | / | / | / | Zr | 0.02 | / | / | 0.985 | balance |

Embodiment 1

The preparation method for the RTB-based permanent magnet material is as follows:

(1) Melting process: according to the formula shown in Table 1, the pre-prepared raw materials were put into the crucible made of aluminum oxide, and was vacuum melted in the high frequency vacuum induction melting furnace and in a vacuum of $5\times10^{-2}$ Pa at a temperature of 1500° C. or less.

(2) Casting process: Ar gas was introduced into the melting furnace after vacuum melting to make the air pressure reach 55,000 Pa, and then casting was carried out, and quenching alloy was obtained at the cooling rate of $10^{2}$° C./s to $10^{4}$° C./s.

(3) Hydrogen decrepitation process: the hydrogen decrepitation furnace with quench alloy placed therein was vacuumed at room temperature, and then hydrogen with a purity of 99.9% was introduced into the hydrogen decrepitation furnace to maintain the hydrogen pressure at 0.15 MPa; after full hydrogen absorption, the temperature was raised while vacuuming for full dehydrogenation; then cooled, and took out the powder obtained from hydrogen decrepitation.

(4) Micro-pulverization process: in nitrogen atmosphere with an oxidizing gas content of 150 ppm or less and under the condition of a pressure of 0.38 MPa in the pulverization chamber, the powder obtained from hydrogen decrepitation was pulverized by jet mill pulverization for 3 hours to obtain fine powder. Oxidizing gas refers to oxygen or moisture.

(5) Zinc stearate was added to the powder pulverized by jet mill, and the addition amount of zinc stearate was 0.12% by weight of the mixed powder, and then a V-type mixer was used to fully mix.

(6) Magnetic field forming process: using a rectangular oriented magnetic field forming machine, in an orientation magnetic field of 1.6T, under a molding pressure of 0.35 ton/$cm^2$, the above-mentioned powder added with zinc stearate was formed into a cube with a side length of 25 mm through primary forming, and it was demagnetized in a magnetic field of 0.2T after the primary forming. In order to keep the formed body obtained after primary forming from contacting the air, it was sealed, and then secondary forming was performed under a pressure of 1.3 ton/$cm^2$ using a secondary molding machine (isostatic pressing machine).

(7) Sintering process: each formed body was moved to the sintering furnace for sintering, sintered in the vacuum of $5\times10^{-3}$ Pa and at 300° C. and 600° C. for 1 h respectively; then, it was sintered at the temperature of 1050° C. for 2 hours; Ar was then introduced to make the air pressure reach 0.1 MPa and then cooled to room temperature.

(8) Aging treatment process: the sintered body was heated from 20° C. to 630° C. at a heating rate of 3-5° C./min in the Ar of high purity; after 3 hours of heat treatment at 630° C., it was cooled to room temperature and taken out.

Embodiment 2-Embodiment 59

The raw materials were prepared according to the formulas shown in Table 1, and other process conditions were the same as those in Embodiment 1, and R-T-B series sintered magnets were obtained.

Embodiment 60

Based on the sintered body obtained in Embodiment 55, the grain boundary diffusion treatment was carried out first, and then the aging treatment was carried out. Wherein, the aging treatment process is the same as in Embodiment 1, and the grain boundary diffusion treatment process is as follows:

The sintered body was processed into the magnet with diameter of 20 mm, and the thickness of the sheet material was less than 3 mm, the direction of the thickness was the direction of magnetic field orientation, after the surface was cleaned, the raw material prepared with Dy fluoride was coated on the magnet through fully spraying respectively, after drying the coated magnet, the metal attached with Tb was sputtered on the surface of the magnet in the high purity Ar atmosphere, and diffusing heat treatment was carried out at 850° C. for 24 hours. Cooled to room temperature.

Embodiment 61

Based on the sintered body obtained in Embodiment 58, and the grain boundary diffusion treatment was carried out first, and then the aging treatment was carried out. Wherein, the aging treatment process is the same as in Embodiment 1, and the grain boundary diffusion treatment process is as follows:

The sintered body was processed into the magnet with diameter of 20 mm, and the thickness of the sheet material was less than 3 mm, the direction of the thickness was the direction of magnetic field orientation, after the surface was cleaned, the raw material prepared with Tb fluoride was coated on the magnet through fully spraying respectively, after drying the coated magnet, the metal attached with Tb was sputtered on the surface of the magnet in the high purity Ar atmosphere, and diffusing heat treatment was carried out at 850° C. for 24 hours. Cooled to room temperature.

Effect Embodiment

The magnetic properties and compositions of R-T-B permanent magnet materials prepared in Embodiments 1-61 and Comparative embodiments 1-3 were determined, and the crystal phase structure of the magnets was observed by Fe-EPMA.

(1) Evaluation of magnetic properties: The NIM-10000H BH bulk rare earth permanent magnetic nondestructive measurement system in National Institute of Metrology, China was used for magnetic properties detection of permanent magnetic materials. The test results of magnetic properties are shown in Table 2 below.

TABLE 2

| No. | Br (kGs) | Hcj (kOe) | Absolute value of Hcj temperature coefficient at 80° C. | Absolute value of Hcj temperature coefficient at 150° C. | Absolute value of Hcj temperature coefficient at 180° C. |
|---|---|---|---|---|---|
| Embodiment 1 | 14.03 | 17.62 | 0.685 | / | / |
| Embodiment 2 | 14.05 | 17.65 | 0.678 | / | / |
| Embodiment 3 | 14.01 | 17.88 | 0.675 | / | / |
| Embodiment 4 | 13.96 | 18.13 | 0.669 | / | / |
| Embodiment 5 | 13.86 | 17.72 | 0.681 | / | / |

TABLE 2-continued

| No. | Br (kGs) | Hcj (kOe) | Absolute value of Hcj temperature coefficient at 80° C. | Absolute value of Hcj temperature coefficient at 150° C. | Absolute value of Hcj temperature coefficient at 180° C. |
|---|---|---|---|---|---|
| Embodiment 6 | 13.78 | 18.65 | 0.663 | / | / |
| Embodiment 7 | 13.64 | 18.99 | 0.660 | / | / |
| Embodiment 8 | 13.49 | 19.33 | 0.655 | / | / |
| Embodiment 9 | 13.23 | 19.75 | 0.651 | / | / |
| Embodiment 10 | 12.93 | 20.69 | 0.642 | / | / |
| Embodiment 11 | 14.08 | 17.67 | 0.683 | / | / |
| Embodiment 12 | 14.03 | 17.95 | 0.673 | / | / |
| Embodiment 13 | 13.95 | 18.21 | 0.667 | / | / |
| Embodiment 14 | 13.83 | 18.82 | 0.663 | | |
| Embodiment 15 | 13.65 | 19.2 | 0.653 | | |
| Embodiment 16 | 13.55 | 19.54 | 0.648 | | |
| Embodiment 17 | 13.26 | 20.22 | 0.645 | | |
| Embodiment 18 | 12.98 | 20.9 | 0.628 | | |
| Embodiment 19 | 13.89 | 17.88 | 0.672 | / | / |
| Embodiment 20 | 13.91 | 18.03 | 0.671 | / | / |
| Embodiment 21 | 13.89 | 18.35 | 0.658 | / | / |
| Embodiment 22 | 14.03 | 18.47 | 0.656 | / | / |
| Embodiment 23 | 14.01 | 18.78 | 0.653 | / | / |
| Embodiment 24 | 14.03 | 18.56 | 0.654 | | |
| Embodiment 25 | 13.98 | 19.10 | 0.646 | | |
| Embodiment 26 | 13.84 | 19.58 | 0.640 | / | / |
| Embodiment 27 | 14.05 | 18.2 | 0.667 | / | / |
| Embodiment 28 | 13.88 | 19.01 | 0.649 | / | / |
| Embodiment 29 | 13.75 | 19.57 | 0.640 | / | / |
| Embodiment 30 | 13.75 | 19.23 | 0.635 | / | / |
| Embodiment 31 | 13.65 | 19.46 | 0.632 | / | / |
| Embodiment 32 | 13.51 | 20.13 | 0.619 | / | / |
| Embodiment 33 | 13.44 | 20.79 | 0.614 | / | / |
| Embodiment 34 | 13.15 | 21.85 | 0.608 | / | / |
| Embodiment 35 | 14.01 | 19.01 | 0.649 | / | / |
| Embodiment 36 | 13.99 | 19.41 | 0.632 | / | / |
| Embodiment 37 | 13.98 | 20.53 | 0.618 | / | / |
| Embodiment 38 | 13.98 | 22.29 | 0.583 | / | / |
| Embodiment 39 | 13.85 | 23.58 | 0.568 | / | / |
| Embodiment 40 | 13.74 | 22.45 | 0.581 | / | / |
| Embodiment 41 | 14.00 | 17.65 | 0.674 | / | / |
| Embodiment 42 | 13.98 | 17.82 | 0.673 | / | / |
| Embodiment 43 | 13.78 | 18.89 | 0.651 | / | / |
| Embodiment 44 | 13.92 | 19.2 | 0.638 | / | / |
| Embodiment 45 | 13.89 | 19.81 | 0.648 | / | / |
| Embodiment 46 | 13.75 | 20.42 | 0.621 | / | / |
| Embodiment 47 | 13.98 | 20.01 | 0.623 | / | / |
| Embodiment 48 | 13.59 | 21.12 | 0.595 | / | / |
| Embodiment 49 | 13.31 | 22.2 | 0.582 | / | / |
| Embodiment 50 | 13.51 | 22.29 | 0.583 | / | / |
| Embodiment 51 | 13.1 | 24.45 | / | 0.489 | / |
| Embodiment 52 | 12.95 | 27.09 | / | 0.461 | / |
| Embodiment 53 | 13.29 | 24.73 | / | 0.493 | / |
| Embodiment 54 | 13.05 | 27.93 | / | 0.456 | / |
| Embodiment 55 | 12.53 | 28.83 | / | 0.451 | / |
| Embodiment 56 | 12.33 | 30.5 | / | / | 0.431 |
| Embodiment 57 | 12.45 | 31.8 | / | / | 0.425 |
| Embodiment 58 | 12.72 | 29.2 | / | 0.442 | / |
| Embodiment 59 | 12.31 | 26.9 | / | 0.512 | |
| Embodiment 60 | 12..40 | 34.85 | / | / | 0.401 |
| Embodiment 61 | 12.21 | 40.52 | / | / | 0.372 |
| Comparative Embodiment 1 | 13.60 | 19.65 | 0.638 | / | / |
| Comparative Embodiment 2 | 14.11 | 16.46 | 0.701 | / | / |
| Comparative Embodiment 3 | 14.2 | 14.8 | 0.771 | / | / |

(2) Composition determination: The components were determined by high frequency inductively coupled plasma emission spectrometer (ICP-OES). The composition test results are shown in Table 3 below.

TABLE 3

| No. | Ce wt. % | Nd wt. % | Pr wt. % | RH kind | RH wt. % | Cu wt. % | Al wt. % | Ga wt. % | Co wt. % | N kind | N wt. % | M kind | M wt. % | B wt. % | Fe wt. % |
|---|---|---|---|---|---|---|---|---|---|---|---|---|---|---|---|
| Embodiment 1 | / | 13.78 | 17.12 | / | / | / | / | / | / | Zr | 0.24 | / | / | 0.913 | balance |
| Embodiment 2 | / | 13.83 | 17.11 | / | / | / | / | / | / | Zr | 0.31 | / | / | 0.912 | balance |
| Embodiment 3 | / | 12.84 | 18.14 | / | / | / | / | / | / | Zr | 0.30 | / | / | 0.9120 | balance |
| Embodiment 4 | / | 11.87 | 19.13 | / | / | / | / | / | / | Zr | 0.32 | / | / | 0.983 | balance |
| Embodiment 5 | / | 13.84 | 17.19 | / | / | / | / | / | / | Zr | 0.42 | / | / | 0.987 | balance |
| Embodiment 6 | / | 11.84 | 19.148 | / | / | / | / | / | / | Zr | 0.99 | / | / | 0.985 | balance |
| Embodiment 7 | / | 11.851 | 19.148 | / | / | / | / | / | / | Zr | 1.49 | / | / | 0.988 | balance |
| Embodiment 8 | / | 11.852 | 19.147 | / | / | / | / | / | / | Zr | 1.99 | / | / | 0.985 | balance |
| Embodiment 9 | / | 12.852 | 18.151 | / | / | / | / | / | / | Zr | 2.99 | / | / | 0.985 | balance |
| Embodiment 10 | / | 11.854 | 19.152 | / | / | / | / | / | / | Zr | 4.01 | / | / | 0.988 | balance |
| Embodiment 11 | / | 13.59 | 17.13 | / | / | / | / | / | / | Ti | 0.31 | / | / | 0.989 | balance |
| Embodiment 12 | / | 12.62 | 18.13 | / | / | / | / | / | / | Ti | 0.42 | / | / | 0.988 | balance |
| Embodiment 13 | / | 11.65 | 19.13 | / | / | / | / | / | / | Ti | 0.48 | / | / | 0.987 | balance |
| Embodiment 14 | / | 11.64 | 19.14 | / | / | / | / | / | / | Ti | 1.01 | / | / | 0.985 | balance |
| Embodiment 15 | / | 11.63 | 19.13 | / | / | / | / | / | / | Ti | 1.51 | / | / | 0.988 | balance |
| Embodiment 16 | / | 11.652 | 19.151 | / | / | / | / | / | / | Ti | 2.01 | / | / | 0.985 | balance |
| Embodiment 17 | / | 11.651 | 19.149 | / | / | / | / | / | / | Ti | 2.98 | / | / | 0.985 | balance |
| Embodiment 18 | / | 11.648 | 19.148 | / | / | / | / | / | / | Ti | 4.01 | / | / | 0.988 | balance |
| Embodiment 19 | / | 14.35 | 17.19 | / | / | / | / | / | / | Nb | 0.29 | / | / | 0.984 | balance |
| Embodiment 20 | / | 13.32 | 18.14 | / | / | / | / | / | / | Nb | 0.13 | / | / | 0.985 | balance |
| Embodiment 21 | / | 12.32 | 19.12 | / | / | / | / | / | / | Nb | 0.26 | / | / | 0.989 | balance |
| Embodiment 22 | / | 13.83 | 17.19 | / | / | 0.33 | / | / | / | Zr | 0.32 | / | / | 0.985 | balance |
| Embodiment 23 | / | 12.63 | 18.19 | / | / | 0.41 | / | / | / | Ti | 0.31 | / | / | 0.988 | balance |
| Embodiment 24 | / | 13.65 | 17.13 | / | / | 0.44 | / | / | / | Ti | 0.4 | / | / | 0.985 | balance |
| Embodiment 25 | / | 11.62 | 19.12 | / | / | 0.51 | / | / | / | Ti | 0.5 | / | / | 0.985 | balance |
| Embodiment 26 | / | 12.32 | 19.09 | / | / | 0.49 | / | / | / | Nb | 0.29 | / | / | 0.988 | balance |
| Embodiment 27 | / | 11.61 | 19.14 | / | / | / | 0.041 | / | / | Ti | 0.28 | / | / | 0.989 | balance |
| Embodiment 28 | / | 11.648 | 19.148 | / | / | / | 0.1 | / | / | Ti | 0.5 | / | / | 0.985 | balance |
| Embodiment 29 | / | 11.647 | 19.148 | / | / | / | 0.2 | / | / | Ti | 0.6 | / | / | 0.985 | balance |
| Embodiment 30 | / | 12.66 | 18.14 | / | / | / | 0.31 | / | / | Ti | 0.35 | / | / | 0.985 | balance |
| Embodiment 31 | / | 13.68 | 17.16 | / | / | / | 0.38 | / | / | Ti | 0.39 | / | / | 0.988 | balance |
| Embodiment 32 | / | 13.83 | 17.08 | / | / | / | 0.5 | / | / | Zr | 0.31 | / | / | 0.989 | balance |
| Embodiment 33 | / | 12.58 | 18.19 | / | / | / | 0.6 | / | / | Ti | 0.28 | / | / | 0.985 | balance |
| Embodiment 34 | / | 12.29 | 19.15 | / | / | / | 0.7 | / | / | Nb | 0.32 | / | / | 0.989 | balance |
| Embodiment 35 | / | 13.79 | 17.18 | / | / | / | / | 0.21 | / | Zr | 0.31 | / | / | 0.985 | balance |
| Embodiment 36 | / | 13.64 | 17.16 | / | / | / | / | 0.23 | / | Ti | 0.28 | / | / | 0.985 | balance |
| Embodiment 37 | / | 12.66 | 18.17 | / | / | / | / | 0.41 | / | Ti | 0.29 | / | / | 0.988 | balance |
| Embodiment 38 | / | 11.64 | 19.14 | / | / | / | / | 0.58 | / | Ti | 0.34 | / | / | 0.985 | balance |
| Embodiment 39 | / | 11.64 | 19.14 | / | / | / | / | 0.81 | / | Ti | 0.42 | / | / | 0.985 | balance |
| Embodiment 40 | / | 12.39 | 19.17 | / | / | / | / | 0.58 | / | Nb | 0.31 | / | / | 0.985 | balance |
| Embodiment 41 | / | 13.89 | 17.16 | / | / | / | / | / | 0.49 | Zr | 0.28 | / | / | 0.989 | balance |
| Embodiment 42 | / | 12.66 | 18.16 | / | / | / | / | / | 0.95 | Ti | 0.31 | / | / | 0.989 | balance |
| Embodiment 43 | / | 12.39 | 19.16 | / | / | / | / | / | 2.4 | Nb | 0.28 | / | / | 0.988 | balance |
| Embodiment 44 | / | 13.64 | 17.13 | / | / | 0.34 | 0.043 | / | 0 | Ti | 0.32 | / | / | 0.985 | balance |
| Embodiment 45 | / | 13.648 | 17.147 | / | / | 0.38 | 0.1 | / | 0 | Ti | 0.5 | | | 0.988 | balance |
| Embodiment 46 | / | 13.651 | 17.148 | / | / | 0.40 | 0.2 | / | 0 | Ti | 0.6 | | | 0.985 | balance |
| Embodiment 47 | / | 12.65 | 18.15 | / | / | 0.4 | 0.32 | / | 0 | Ti | 0.34 | / | / | 0.988 | balance |
| Embodiment 48 | / | 13.67 | 17.14 | / | / | 0.45 | 0.41 | / | 0 | Ti | 0.42 | / | / | 0.989 | balance |
| Embodiment 49 | / | 11.63 | 19.14 | / | / | 0.51 | 0.48 | / | 0 | Ti | 0.44 | / | / | 0.984 | balance |
| Embodiment 50 | / | 13.84 | 17.14 | / | / | 0.33 | 0.49 | 0.21 | 0.51 | Zr | 0.32 | / | / | 0.985 | balance |
| Embodiment 51 | / | 12.72 | 18.19 | / | / | 0.41 | 0.62 | 0.39 | 1.1 | Ti | 0.31 | / | / | 0.989 | balance |
| Embodiment 52 | / | 12.39 | 19.16 | / | / | 0.52 | 0.69 | 0.59 | 2.4 | Nb | 0.29 | / | / | 0.985 | balance |
| Embodiment 53 | / | 12.82 | 18.15 | / | / | 0.41 | 0.62 | 0.41 | 2.53 | Zr | 0.31 | Cr | 0.05 | 0.988 | balance |
| Embodiment 54 | / | 12.83 | 18.16 | / | / | 0.39 | 0.59 | 0.42 | 2.45 | Zr | 0.28 | Cr | 0.12 | 0.985 | balance |
| Embodiment 55 | / | 12.36 | 18.14 | Dy | 1.53 | 0.37 | 0.61 | 0.41 | 2.4 | Nb | 0.32 | / | / | 0.989 | balance |
| Embodiment 56 | / | 11.36 | 18.15 | Dy | 2.43 | 0.42 | 0.59 | 0.40 | 2.35 | Nb | 0.31 | / | / | 0.985 | balance |
| Embodiment 57 | / | 11.37 | 18.13 | Tb | 1.9 | 0.41 | 0.59 | 0.43 | 2.4 | Nb | 0.29 | / | / | 0.988 | balance |
| Embodiment 58 | / | 11.32 | 18.19 | Tb | 1.12 | 0.41 | 0.59 | 0.41 | 2.53 | Nb | 0.29 | / | / | 0.987 | balance |
| Embodiment 59 | 0.25 | 11.35 | 18.15 | Tb | 1.18 | 0.42 | 0.62 | 0.38 | 2.4 | Nb | 0.28 | / | / | 0.99 | balance |
| Embodiment 60 | / | 12.37 | 18.13 | Dy | 2.02 | 0.38 | 0.62 | 0.42 | 2.42 | Nb | 0.31 | / | / | 0.988 | balance |
| Embodiment 61 | / | 11.39 | 18.17 | Tb | 1.58 | 0.41 | 0.58 | 0.42 | 2.51 | Nb | 0.28 | / | / | 0.988 | balance |
| Comparative Embodiment 1 | / | 13.79 | 17.13 | / | / | / | / | / | / | Mo | 2.13 | / | / | 0.989 | balance |
| Comparative Embodiment 2 | / | 13.83 | 17.11 | / | / | / | / | / | / | Zr | 0.01 | / | / | 0.989 | balance |
| Comparative Embodiment 3 | / | 25.3 | 6.1 | / | / | / | / | / | / | Zr | 0.29 | / | / | 0.987 | balance |

(3) FE-EPMA inspection: the perpendicularly oriented surface of the permanent magnet material in Embodiment 50 was polished and inspected using a field emission electron probe micro-analyzer (FE-EPMA) (Japan Electronics Corporation (JEOL), 8530F). The distribution of Pr, Cu, Al, B, Fe, Co and other elements in the permanent magnet material was first determined by FE-EPMA surface scanning, and then the content of Pr, Cu, Al and other elements in the key phase was determined by FE-EPMA single-point quantitative analysis with the test conditions of acceleration voltage 15 kv and probe beam current 50 nA.

The magnetic steel prepared by the formula of Embodiment 50 was mainly analyzed for Fe, Ga, Pr, Nd, Co, Al, Cu, Zr and B elements by using a field emission electron probe microanalyzer (FE-EPMA).

1) It can be seen from FIG. 1 that Pr is mainly distributed in the main phase, and the Pr content in the main phase of $R_2Fe_{14}B$ is more than 60% of the total rare earth content, the grain boundary phase contains some Pr which exists in the form of $\alpha$-Pr and/or $Pr_2O_3$, and the grain boundary phase also contains $\alpha$-Nd and/or $Nd_2O_3$. It can be seen that the $(PrNd)_2Fe_{14}B$ formed by the addition of Pr in the main phase will slightly decrease the remanence of the magnet, which is due to the slightly lower saturation magnetization intensity of $Pr_2Fe_{14}B$; the Hcj of the magnet is improved, which is due to the higher anisotropy field of $Pr_2Fe_{14}B$ than that of $Nd_2Fe_{14}B$. In addition, due to the characteristics of easy oxidation of rare earth, some $Pr_2O_3$ and $Nd_2O_3$ will appear at the grain boundary, and the rest are a series of rare earths, all the phases at the grain boundary are nonmagnetic, so the demagnetization coupling between the main phase and the main phase is effectively isolated, which helps to improve the Hcj of the magnet.

Figure 2:
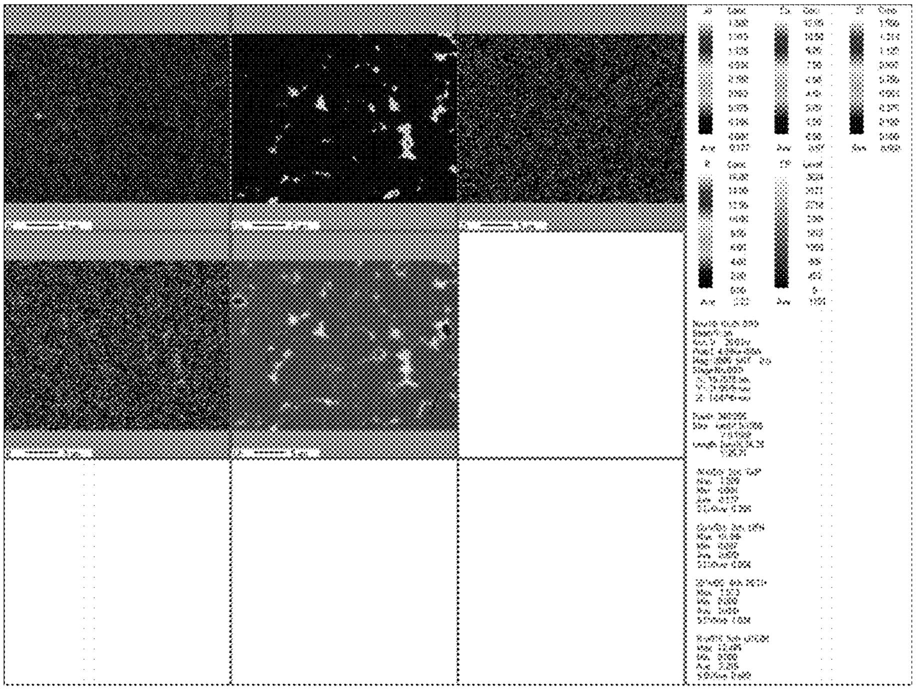
FIG. 2 is the distribution diagram of Al, Cu, Zr and B formed by the FE-EPMA surface scanning of the sintered magnet prepared in Embodiment 50.

2) As can be seen from FIG. 1 and FIG. 2, Al (80%-95%) is distributed in the main phase, which tends to decrease the remanence while increasing the coercivity, in addition, Al is distributed at the grain boundary. Cu (55%-68%) is distributed in the main phase, according to the analysis of EPMA results, there is obvious Cu element in the grain boundary and in the intergranular triangle. The interaction of Cu element and Al element at grain boundary increases the wettability of grain boundary and main phase, makes grain boundary smoother, repairs grain boundary defects and effectively improves coercivity. Wherein, the grain boundary refers to the boundary between two grains, and the intergranular triangle refers to the void formed by three or more grains.

3) As can be seen from FIG. 1 and FIG. 2, Zr is dispersed in the main phase and grain boundary phase. The melting point of $Pr_2Fe_{14}B$ is slightly lower than that of normal $Nd_2Fe_{14}B$, meanwhile, the temperature of the ternary eutectic point also changes and its temperature coefficient deteriorates. However, when high Pr is combined with Zr element, Zr element is dispersed everywhere, which improves the temperature resistance of magnetic steel, facilitates the densification of sintering process, and makes up for the defect of deterioration of temperature coefficient caused by Pr, it can be seen that Zr element and high Pr have synergistic effect. At the same time, the high melting point metal Zr is distributed at the grain boundary, which is beneficial to the pinning of magnetic domains in magnet steel, it is not easy to demagnetize at high temperature, which effectively improves the high temperature performance of magnet.

According to the properties of magnets with Ti and Nb in the high Pr system, the distribution of Ti and Nb in the high Pr magnets is the same/similar to that of Zr elements, which provides sintered permanent magnets with high coercivity and stable temperature coefficient by synergism with high Pr.

What is claimed is:

1. An R-T-B permanent magnet material, which comprises the following components by mass percentage:

R': 29.5-33.0 wt. %, R' comprising R and Pr, Nd; wherein: R is a rare earth element other than Pr and Nd, the content of Pr is 17.00-19.17 wt. %, the mass ratio of Nd to R' is <0.5;

X: X is Ti, Zr or Nb;

B: 0.90-1.2 wt. %;

Fe: 62.0-68.0 wt. %;

provided that:

when the X is Zr, then the content of Zr is 1.49-4.01 wt. %;

when the X is Ti, then the content of Ti is 0.28-4.01 wt. %;

when the X is Nb, then the content of Nb is 0.13-0.32 wt. %.

2. The R-T-B permanent magnet material according to claim 1, wherein, the content of R' is 30-33 wt. %, the percentage refers to the mass percentage in the R-T-B permanent magnet material;

or, the content of Nd is 11-15 wt. %, the percentage refers to the mass percentage in the R-T-B permanent magnet material;

or, the mass ratio of Nd to R' is ≥0.3 and <0.5;

or, the content of B is 0.9-1.0 wt. %, the percentage refers to the mass percentage in the R-T-B permanent magnet material;

or, the content of Fe is 62.3-68.0 wt. %, the percentage refers to the mass percentage in the R-T-B permanent magnet material.

3. A preparation method for the R-T-B permanent magnet material according to claim 1, wherein, the preparation method comprises the following steps: molten liquid of a raw material composition of the R-T-B permanent magnet material is subjected to casting, hydrogen decrepitation, forming, sintering and aging;

wherein the raw material composition of the R-T-B permanent magnet material comprises the following components by mass percentage:

R': 29.5-32.0 wt. %, R' comprising R and Pr, Nd; wherein: R is a rare earth element other than Pr and Nd, the content of Pr is ≥8.85 wt. %, the mass ratio of Nd to R' is <0.5;

X: X is Ti, Zr or Nb;

B: 0.90-1.2 wt. %;

Fe: 62.0-68.0 wt. %;

provided that:

when the X is Zr, then the content of Zr is 1.5-4.0 wt. %;

when the X is Ti, then the content of Ti is 0.3-4.0 wt. %;

when the X is Nb, then the content of Nb is 0.15-0.3 wt. %.

4. An electronic component comprising the R-T-B permanent magnet material according to claim 1.

5. The R-T-B permanent magnet material according to claim 1, wherein, when the X is Zr, the content of Zr is 2.99-4.01 wt. %;

or, when the X is Ti, the content of Ti is 2.98-4.01 wt. %;

or, when the X is Nb, the content of Nb is 0.31 wt. %-0.32 wt. %;

the percentage refers to the mass percentage in the R-T-B permanent magnet material.

6. The R-T-B permanent magnet material according to claim 1, wherein, the content of R is 0-1 wt. %, but not 0, the percentage refers to the mass percentage in the R-T-B permanent magnet material;

or, R' further comprises a heavy rare earth element RH; wherein, is selected from the group consisting of Dy and Tb; the content of RH is 1.0-2.5 wt. %, the percentage refers to the mass percentage of the R-T-B permanent magnet material.

7. The R-T-B permanent magnet material according to claim 1, wherein, the R-T-B permanent magnet material further comprises Cu, the content of Cu is ≥0.30 wt. %, the percentage refers to the mass percentage in the R-T-B permanent magnet material;

or, the R-T-B permanent magnet material further comprises Al, the content of Al is 0-0.8 wt. %, but not 0, the percentage refers to the mass percentage in the R-T-B permanent magnet material;

or, the R-T-B permanent magnet material further comprises Ga, the content of Ga is 0.0-0.85 wt. %, but not 0, the percentage refers to the mass percentage in the R-T-B permanent magnet material;

or, the R-T-B permanent magnet material further comprises Co, the content of Co is 0.0-3.0 wt. %, but not 0, the percentage refers to the mass percentage in the R-T-B permanent magnet material;

or, the R-T-B permanent magnet material further comprises addition element M, and M is at least one selected from the group consisting of Ni, Zn, Ag, In, Sn, Bi, V, Cr, Hf, Ta, and W; the content of M is 0-0.15 wt. %, but not 0, the percentage refers to the mass percentage in the R-T-B permanent magnet material.

8. An R-T-B permanent magnet material, which comprises the following components by mass percentage:

R': 29.5-33.0 wt. %, R' comprising R and Pr, Nd; wherein: R is a rare earth element other than Pr and Nd, the content of Pr is 17.00-19.17 wt. %, the mass ratio of Nd to R' is <0.5;

B: 0.90-1.2 wt. %;

Fe: 62.0-68.0 wt. %;

X is Ti or Zr;

provided that:

when the X is Zr, the content of Zr is 1.49-4.01 wt. %;

when the X is Ti, the content of Ti is 1.51-4.01 wt. %;

the main phase crystalline particle of the R-T-B permanent magnet material is $R''_2Fe_{14}B$, the R" comprises Pr and Nd, the mass fraction of Pr in the R" is ≥ 60%;

Zr or Ti is dispersed in the main phase and grain boundary phase of in the R-T-B permanent magnet material.

9. The preparation method for R-T-B permanent magnet material according to claim 3, wherein, the molten liquid of the raw material composition of R-T-B permanent magnet material is prepared by the following method: melting in a high frequency vacuum induction melting furnace; the vacuum degree of the melting furnace is $5\times10^{-2}$ Pa; the melting temperature is 1500° C. or less;

the casting process is carried out as follows: cooling at a rate of $10^{2}$° C./s $-10^{4}$° C./s in an Ar atmosphere;

the hydrogen decrepitation process comprises hydrogen absorption, dehydrogenation and cooling treatment, the hydrogen absorption is carried out under the hydrogen pressure of 0.15 MPa;

the sintering process is carried out as follows: preheating, sintering and cooling under vacuum condition; the temperature of the preheating is 300-600° C., the duration of the preheating is 1-2 h; the temperature of the sintering is 1040-1090° C.;

in the aging treatment, the temperature of the secondary aging is 500-650° C.; in the secondary aging, the temperature is increased to 500-650° C. with a heating rate of 3-5° C./min.

10. The preparation method for R-T-B permanent magnet material according to claim 3, wherein, a grain boundary diffusion treatment is further carried out after sintering and before the aging treatment; the grain boundary diffusion treatment is carried out according to the following steps, attaching a substance selected from a substance containing Tb and a substance containing Dy to a surface of the R-T-B permanent magnet material by evaporating, coating or sputtering, then carrying out diffusion heat treatment; the temperature of the diffusion heat treatment is 800-900° C.; the duration of the diffusion heat treatment is 12-48 h.

11. The preparation method for R-T-B permanent magnet material according to claim 3, wherein, the content of R' is 30.0-32.0 wt. %, the percentage refers to the mass percentage in the raw material composition of R-T-B permanent magnet material;

or, the content of Nd is 11.00-15.00 wt. %, the percentage refers to the mass percentage in the raw material composition of R-T-B permanent magnet material;

or, the mass ratio of Nd to R' is ≥0.3 and <0.5;

or, the content of B is 0.985-1.2 wt. %;

or, the content of Fe is 62.81-67.92 wt. %, the percentage refers to the mass percentage in the raw material composition of R-T-B permanent magnet material.

12. The preparation method for R-T-B permanent magnet material according to claim 3, wherein, the content of Pr is 17.15-19.15 wt. %;

or, when the X is Zr, the content of Zr is 3.0-4.0 wt. %;

or, when the X is Ti, the content of Ti is 3.0 wt. %-4.0 wt. %;

or, when the X is Nb, the content of Nb is 0.25-0.30 wt. %;

the percentage refers to the mass percentage in the raw material composition of R-T-B permanent magnet material.

13. The preparation method for R-T-B permanent magnet material according to claim 3, wherein, the content of R is 0-1 wt. %, the percentage refers to the mass percentage in the raw material composition of R-T-B permanent magnet material;

or, R' further comprises a heavy rare earth element RH; RH is selected from the group consisting of Dy and Tb; the content of RH is 1.0-2.5 wt. %, the percentage refers to the mass percentage in the raw material composition of R-T-B permanent magnet material;

or, the raw material composition of R-T-B permanent magnet material further comprises Cu, the content of Cu is ≥0.34 wt. %, the percentage refers to the mass percentage in the raw material composition of R-T-B permanent magnet material;

or, the raw material composition of R-T-B permanent magnet material further comprises Al, the content of Al is 0.042-0.7 wt. %, the percentage refers to the mass percentage in the raw material composition of R-T-B permanent magnet material;

or, the raw material composition of R-T-B permanent magnet material further comprises Ga, the content of Ga is 0.0-0.8 wt. %, but not 0, the percentage refers to the mass percentage in the raw material composition of R-T-B permanent magnet material;

or, the raw material composition of R-T-B permanent magnet material further comprises Co, the content of Co is 0.0-3.0 wt. %, but not 0, the percentage refers to the mass percentage in the raw material composition of R-T-B permanent magnet material;

or, the raw material composition of R-T-B permanent magnet material further comprises addition element M, M is at least one selected from the group consisting of Ni, Zn, Ag, In, Sn, Bi, V, Cr, Hf, Ta, and W; the content of M is 0-0.15 wt. %, but not 0, the percentage refers to the mass percentage in the raw material composition of R-T-B permanent magnet material.

14. The R-T-B permanent magnet material according to claim 1, wherein, the main phase crystalline particle is $R''_2Fe_{14}B$, the R" comprises Pr and Nd, the mass fraction of Pr in the R" is ≥60%.

15. The R-T-B permanent magnet material according to claim 8, wherein, when the X is Zr, the content of Zr is 2.99-4.01 wt. %;

or, when the X is Ti, the content of Ti is 2.98-4.01 wt. %; the percentage refers to the mass percentage in the R-T-B permanent magnet material.

16. The R-T-B permanent magnet material according to claim 8, wherein, the R-T-B permanent magnet material further comprises Cu, the content of Cu is ≥0.30 wt. %, the percentage refers to the mass percentage in the R-T-B permanent magnet material;

or, the R-T-B permanent magnet material further comprises Al, the content of Al is 0-0.8 wt. %, but not 0, the percentage refers to the mass percentage in the R-T-B permanent magnet material;

or, the R-T-B permanent magnet material further comprises Ga, the content of Ga is 0.0-0.85 wt. %, but not 0, the percentage refers to the mass percentage in the R-T-B permanent magnet material;

or, the R-T-B permanent magnet material further comprises Co, the content of Co is 0.0-3.0 wt. %, but not 0, the percentage refers to the mass percentage in the R-T-B permanent magnet material;

or, the R-T-B permanent magnet material further comprises addition element M, and M is at least one selected from the group consisting of Ni, Zn, Ag, In, Sn, Bi, V, Cr, Hf, Ta, and W; the content of M is 0-0.15 wt. %, but not 0, the percentage refers to the mass percentage in the R-T-B permanent magnet material.

17. An electronic component comprising the R-T-B permanent magnet material according to claim 8.

18. A preparation method for the R-T-B permanent magnet material according to claim 8, wherein, the preparation method comprises the following steps: molten liquid of a raw material composition of the R-T-B permanent magnet material is subjected to casting, hydrogen decrepitation, forming, sintering and aging;

wherein the raw material composition of the R-T-B permanent magnet material comprises the following components by mass percentage:

R': 29.5-32.0 wt. %, R' comprising R and Pr, Nd; wherein: R is a rare earth element other than Pr and Nd, the content of Pr is ≥8.85 wt. %, the mass ratio of Nd to R' is <0.5;

X: X is Ti or Zr;

B: 0.90-1.2 wt. %;

Fe: 62.0-68.0 wt. %;

provided that:

when the X is Zr, then the content of Zr is 1.5-4.0 wt. %;

when the X is Ti, then the content of Ti is 1.5-4.0 wt. %.

19. The preparation method for R-T-B permanent magnet material according to claim 18, wherein, the content of Pr is 17.15-19.15 wt. %;

or, when the X is Zr, the content of Zr is 3.0-4.0 wt. %;

or, when the X is Ti, the content of Ti is 3.0 wt. %-4.0 wt. %;

the percentage refers to the mass percentage in the raw material composition of R-T-B permanent magnet material.

20. The preparation method for R-T-B permanent magnet material according to claim 18, wherein, the molten liquid of the raw material composition of R-T-B permanent magnet material is prepared by the following method: melting in a high frequency vacuum induction melting furnace; the vacuum degree of the melting furnace is $5\times10^{-2}$ Pa; the melting temperature is 1500° C. or less;

the casting process is carried out as follows: cooling at a rate of $10^{2}$° C./s $-10^{4}$° C./s in an Ar atmosphere;

the hydrogen decrepitation process comprises hydrogen absorption, dehydrogenation and cooling treatment, the hydrogen absorption is carried out under the hydrogen pressure of 0.15 MPa;

the sintering process is carried out as follows: preheating, sintering and cooling under vacuum condition; the temperature of the preheating is 300-600° C., the duration of the preheating is 1-2 h; the temperature of the sintering is 1040-1090° C.;

in the aging treatment, the temperature of the secondary aging is 500-650° C.; in the secondary aging, the temperature is increased to 500-650° C. with a heating rate of 3-5° C./min.

* * * * *